United States Patent
Kunitake et al.

(10) Patent No.: US 10,650,802 B2
(45) Date of Patent: May 12, 2020

(54) VOICE RECOGNITION METHOD, RECORDING MEDIUM, VOICE RECOGNITION DEVICE, AND ROBOT

(71) Applicant: Panasonic Intellectual Property Management Co., Ltd., Osaka (JP)

(72) Inventors: Yuji Kunitake, Kyoto (JP); Yusaku Ota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 163 days.

(21) Appl. No.: 16/019,701

(22) Filed: Jun. 27, 2018

(65) Prior Publication Data

US 2019/0013008 A1    Jan. 10, 2019

(30) Foreign Application Priority Data

Jul. 5, 2017   (JP) .................................. 2017-131762
Mar. 5, 2018   (JP) .................................. 2018-038717

(51) Int. Cl.
*G10L 15/02*    (2006.01)
*G10L 15/22*    (2006.01)
(Continued)

(52) U.S. Cl.
CPC .............. *G10L 15/02* (2013.01); *G10L 15/08* (2013.01); *G10L 15/22* (2013.01); *G10L 15/32* (2013.01);
(Continued)

(58) Field of Classification Search
USPC .......................... 704/246, 247, 251, 252, 254
See application file for complete search history.

(56) References Cited

U.S. PATENT DOCUMENTS 9,123,339 B1    9/2015  Shaw et al.
10,403,274 B2*  9/2019  Girod .................... G10L 15/187
(Continued)

FOREIGN PATENT DOCUMENTS

JP    11-249688    9/1999

OTHER PUBLICATIONS

Extended European Search Report, dated Oct. 31, 2018, by the European Patent Office (EPO) for the related European Patent Application No. 18181408.8.
(Continued)

*Primary Examiner* — Leonard Saint Cyr
(74) *Attorney, Agent, or Firm* — Greenblum & Bernstein, P.L.C.

(57) ABSTRACT

A voice recognition method is provided that includes extracting a first speech from the sound collected with a microphone connected to a voice processing device, and calculating a recognition result for the first speech and the confidence level of the first speech. The method also includes performing a speech for a repetition request based on the calculated confidence level of the first speech, and extracting with the microphone a second speech obtained through the repetition request. The method further includes calculating a recognition result for the second speech and the confidence level of the second speech, and generating a recognition result from the recognition result for the first speech and the recognition result for the second speech, based on the confidence level of the calculated second speech.

11 Claims, 18 Drawing Sheets

(51) Int. Cl.
  *G10L 15/32* (2013.01)
  *G10L 15/08* (2006.01)
  *G10L 15/187* (2013.01)

(52) U.S. Cl.
  CPC ...... *G10L 15/187* (2013.01); *G10L 2015/025* (2013.01); *G10L 2015/223* (2013.01)

(56) References Cited

U.S. PATENT DOCUMENTS

2005/0119883 A1* 6/2005 Miyazaki .............. G10L 15/142
  704/231
2008/0059167 A1 3/2008 Poultney et al.
2017/0076722 A1* 3/2017 Girod ...................... G10L 15/02

OTHER PUBLICATIONS

Takaaki Hori et al., "State-of-the-art Technology of Speech Information Processing: Speech Recognition Using Weighted Finite-State Transducers", The Information Processing Society of Japan, IPSJ Magazine vol. 45, No. 10, Oct. 2004, pp. 1020-1026.

* cited by examiner

FIG. 2

|  | FIRST PHONEME | | SECOND PHONEME | |
|---|---|---|---|---|
| PHONEME | V | B | IY1 | AW1 |
| OCCURRENCE PROBABILITY | 0.4 | 0.5 | 0.3 | 0.6 |

FIG. 3

| PHONEME STRING | VIY1 | VAW1 | BIY1 | BAW1 |
|---|---|---|---|---|
| OCCURRENCE PROBABILITY | 0.12 | 0.24 | 0.15 | 0.30 |

FIG. 5

ROBO1: What is your favorite food?

CHILD1: Curry.

ROBO2: Please speak slowly again.

CHILD2: Curry.

FIG. 6

| FIRST RECOGNITION RESULT | RECOGNIZED WORD | Sherry | | | |
|---|---|---|---|---|---|
| | RECOGNIZED PHONEME STRING | SH | EH1 | R | IY0 |
| | OCCURRENCE PROBABILITY OF PHONEME | 0.2 | 0.3 | 0.9 | 0.8 |
| SECOND RECOGNITION RESULT | RECOGNIZED WORD | Color | | | |
| | RECOGNIZED PHONEME STRING | K | AH1 | L | ER0 |
| | OCCURRENCE PROBABILITY OF PHONEME | 0.8 | 0.7 | 0.3 | 0.2 |

FIG. 7

| WORD DICTIONARY | |
|---|---|
| PHONEME STRING | WORD |
| K AH1 R IY0 | Curry |
| K AE1 R IY0 | Carry |
| SH EH1 R IY0 | Sherry |
| K AA1 R | CAR |
| K AH1 R IY0 R AY1 S | Curry rice |
| ... | ... |

FIG. 8

| CANDIDATES FOR RECOGNITION WORD EXTRACTED FROM FIRST RECOGNITION RESULT | |
|---|---|
| PHONEME STRING | WORD |
| K AH1 R IY0 | Curry |
| K AE1 R IY0 | Carry |
| SH EH1 R IY0 | Sherry |
| K AH1 R IY0 R AY1 S | Curry rice |

FIG. 9

| FIRST RECOGNITION RESULT | RECOGNIZED WORD | Car | | |
|---|---|---|---|---|
| | RECOGNIZED PHONEME STRING | K | AA1 | R |
| | OCCURRENCE PROBABILITY OF PHONEME | 0.7 | 0.3 | 0.8 |
| SECOND RECOGNITION RESULT | RECOGNIZED WORD | Sherry | | |
| | RECOGNIZED PHONEME STRING | B | EY1 | IYO |
| | OCCURRENCE PROBABILITY OF PHONEME | 0.2 | 0.3 | 0.8 |

FIG. 14

| 2-gram WORD COMBINATION | OCCURRENCE PROBABILITY |
|---|---|
| sil, it's | 0.6 |
| sil, curry | 0 |
| sil, cherry | 0 |
| It's, curry | 0.5 |
| It's, cherry | 0.3 |
| it's, sil | 0 |
| curry, it's | 0 |
| curry, cherry | 0 |
| curry, sil | 0.5 |
| cherry, it's | 0 |
| cherry, curry | 0 |
| cherry, sil | 0.5 |

FIG. 19

| FIRST RECOGNITION RESULT | CONFIDENCE LEVEL OF SENTENCE |
|---|---|
| I like curry | 0.60 |
| I don't like curry | 0.54 |
| I want curry | 0.51 |
| It is curry | 0.44 |
| I like cherry | 0.20 |

FIG. 20

| SECOND RECOGNITION RESULT | CONFIDENCE LEVEL OF SENTENCE |
|---|---|
| I like berry | 0.65 |
| I like curry | 0.55 |
| It is cherry | 0.42 |
| I don't like cherry | 0.32 |
| I want curry | 0.27 |

VOICE RECOGNITION METHOD, RECORDING MEDIUM, VOICE RECOGNITION DEVICE, AND ROBOT

BACKGROUND

1. Technical Field

The present disclosure relates to a technique in voice recognition.

2. Description of the Related Art

In recent years, various voice recognition methods have been proposed for estimating a word string indicating the content of a speech from sound data of the speech.

For example, Japanese Unexamined Patent Application Publication No. 11-249688 (hereinafter referred to as Patent Document 1) discloses a voice recognition method as described below. In the method, sound data of a speech is divided into multiple phoneme sections x, a phoneme model is assigned to each phoneme section x, likelihood Psn of a phoneme model p assigned to the n-th phoneme section x is obtained, and difference likelihood Pdn is obtained which is difference between the likelihood Psn and the largest value Pmaxn of likelihood of phoneme models other than the phoneme model p for the phoneme section x. Then, each of the likelihood Psn and the difference likelihood Pdn is inputted to a correct phoneme section likelihood model and an incorrect phoneme likelihood model to obtain likelihood Lnc of the correct phoneme section likelihood model and likelihood Lni of the incorrect phoneme likelihood model. Then, difference likelihood cn between the likelihood Lnc and the likelihood Lni is obtained, and the sum of the difference likelihood cn for all the phoneme sections is obtained as word confidence level WC. If the word confidence level WC is higher than or equal to a threshold, the phoneme string assigned to the sound data is outputted. If word confidence level WC is lower than the threshold, the phoneme string is rejected.

However, in Patent Document 1, only the phoneme likelihood is taken into consideration, and language likelihood is not at all. Thus, there is a problem that a phoneme string natural as language cannot be reproduced.

In view of the above, Hori. T, Tsukada. H: Speech Recognition Using Weighted Finite-State Transducers, Journal of Information Processing Society of Japan, Vol. 45, No. 10, October 2004, pp. 1020 to 1026, State-of-the-art Technology of Speech Information Processing: 3 (hereinafter referred to as Non-Patent Document 1) discloses a method of performing voice recognition on a speech and estimating the word string by using acoustic likelihood and language likelihood. Specifically, in Non-Patent Document 1, word string W that maximizes the product of the probability in the right side of Formula (1) is selected as recognition result. Here, w is a word string, and P(O|w) is the probability (acoustic likelihood) that the phoneme string of word string w is O, which is calculated from acoustic models. P(w) is the probability (language likelihood) indicating likelihood of w as language, which is calculated from language models based on occurrence frequency information of consecutive words, such as n-gram.

In this method, the product of this acoustic likelihood and the language likelihood is outputted as the certainty of recognition result (the confidence level of the sentence) together with the recognition result.

$$W = \underset{w}{\mathrm{argmax}} P(O|w)P(w) \quad (1)$$

SUMMARY

However, in Non-Patent Document 1, if an inputted speech is unclear or is strongly affected by noise, the confidence level of the sentence is low. Then, if the confidence level of the sentence is low, there exists a problem that the probability of including an error in recognition result is high.

This disclosure has been made to solve these problems.

In one general aspect, the techniques disclosed here feature a voice recognition method including: receiving via a microphone a first speech that a speaker makes intending one word, the first speech including N phonemes, where N is a natural number of 2 or more; calculating occurrence probabilities of all kinds of phonemes for each of the N phonemes included in the first speech; recognizing a phoneme string, in which phonemes each having the highest probability are lined in order, to be a first phoneme string corresponding to the first speech, the phonemes corresponding to the respective N phonemes from a first phoneme to an N-th phoneme included in the first speech; calculating a first value by multiplying together occurrence probabilities that the N phonemes included in the first phoneme string have; if the first value is smaller than a first threshold, outputting a voice to prompt the speaker to repeat the one word, via a loudspeaker; receiving via the microphone a second speech that the speaker repeats intending the one word, the second speech including M phonemes, where M is a natural number of 2 or more; calculating occurrence probabilities of all kinds of phonemes for each of the M phonemes included in the second speech; recognizing a phoneme string, in which phonemes each having the highest probability are lined in order, to be a second phoneme string corresponding to the second speech, the phonemes corresponding to the respective M phonemes from a first phoneme to an M-th phoneme included in the second speech; calculating a second value by multiplying together occurrence probabilities that the M phonemes included in the second phoneme string have; if the second value is smaller than the first threshold, extracting a phoneme having occurrence probability higher than a second threshold out of the first phoneme string and a phoneme having occurrence probability higher than the second threshold out of the second phoneme string; extracting a word including the extracted phonemes from a dictionary stored in a memory, the dictionary associating words with respective phoneme strings; and if the number of extracted words is one, recognizing the extracted word to be the one word.

These general and specific aspects may be implemented using a system, a method, and a computer program, and any combination of systems, methods, and computer programs.

This disclosure improves recognition accuracy even if the speaker is a little child or even under the environment where inputted speeches are strongly affected by noise.

Additional benefits and advantages of the disclosed embodiments will become apparent from the specification and drawings. The benefits and/or advantages may be individually obtained by the various embodiments and features

BRIEF DESCRIPTION OF THE DRAWINGS

FIG. 2 is a diagram illustrating an example of occurrence probabilities calculated for every phoneme in a speech including two phonemes;

FIG. 3 is a diagram in which products of occurrence probabilities of combinations of phonemes at the first phoneme and phonemes at the second phoneme in FIG. 2 are organized;

FIG. 5 is a diagram illustrating an example of a dialogue in Embodiment 1;

FIG. 6 is a diagram illustrating an example of first recognition result and second recognition result for the dialogue example in FIG. 5;

FIG. 7 is a diagram illustrating an example of data structure of a word dictionary;

FIG. 8 is a diagram illustrating an example of recognition candidate words extracted from the first recognition result;

FIG. 9 is a diagram illustrating another example of processing to narrow down recognition candidate words from the first recognition result and the second recognition result in Embodiment 1;

FIG. 14 is a diagram illustrating an example of a word dictionary for the case of employing a 2-gram language model for the specific example of Embodiment 2;

FIG. 19 is a diagram illustrating an example of 5-best candidates for first recognition result in Embodiment 3;

FIG. 20 is a diagram illustrating an example of 5-best candidates for second recognition result in Embodiment 3.

Figure 1:
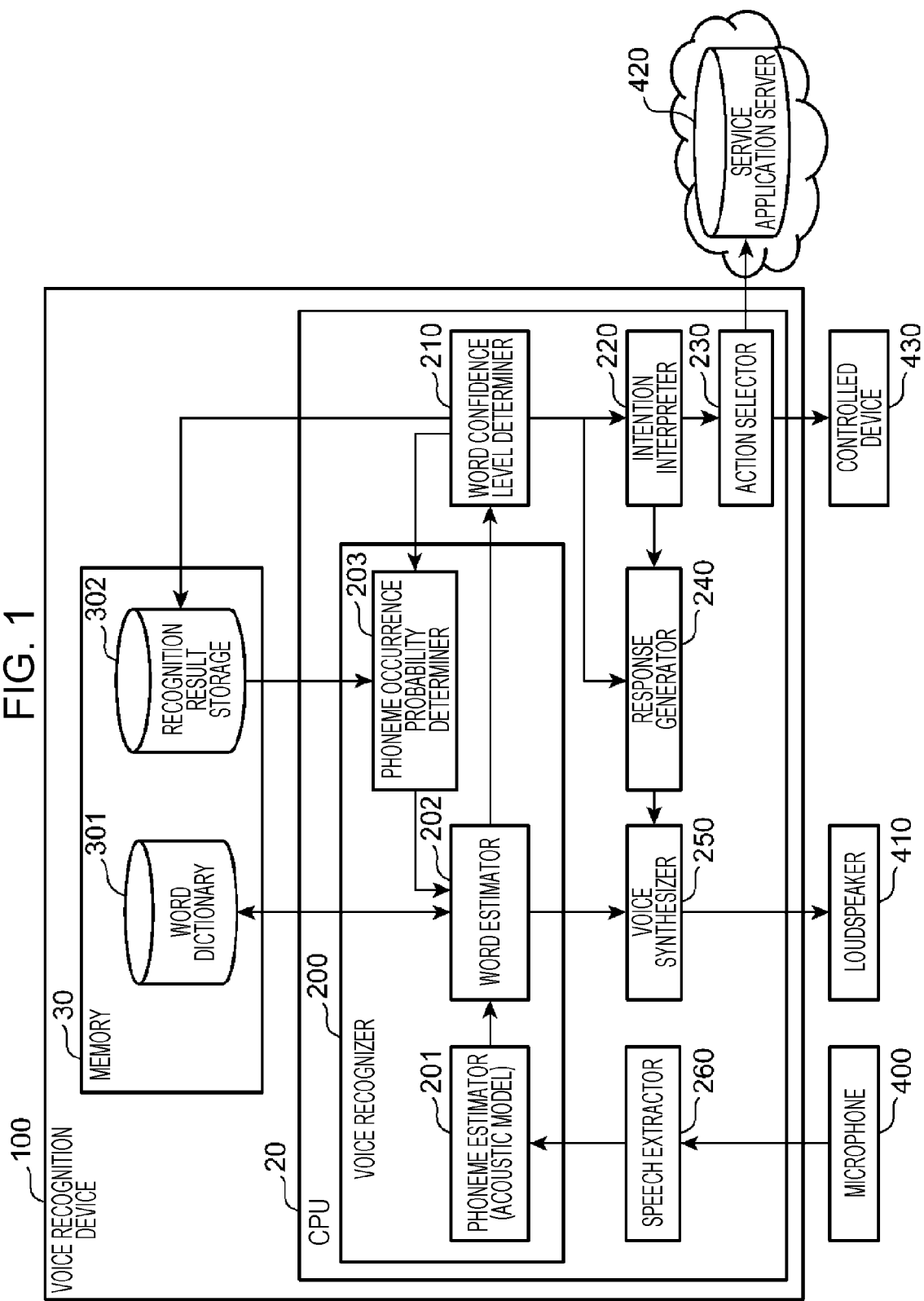
FIG. 1 is a diagram illustrating an example of the overall configuration of a voice dialogue system in Embodiment 1.

DETAILED DESCRIPTION (Underlying Knowledge Forming Basis of the Present Disclosure)

Techniques related to voice dialogue systems have been investigated for analyzing a speech content from voice that the user speaks and returning a natural response based on the analysis result to achieve natural dialogue with the user or to provide a service such as controlling a device or providing information.

The recognition accuracy of general voice recognition systems for adults exceeds 90%. Even if a system cannot recognize a speech, the system discards the recognition result the confidence level of which is low and asks the speaker to speak slowly or clearly through a repetition request, and thus the system provides enough capability in acquiring recognition result having high confidence levels.

However, general voice recognition systems still have a problem that the recognition accuracy is low for speeches made by a little child in the language learning stage or under the environment where inputted speeches are strongly affected by noise, and recognition result having a high confidence level cannot be obtained even if a repetition request is performed.

A technique disclosed in Non-Patent Document 1 is capable of outputting a word string like language, but it does not include disclosure on a repetition request for the case where recognition result with a low confidence level is obtained. Hence, Non-Patent Document 1 does not solve the above problem.

Patent Document 1 only discloses that when recognition result with a low confidence level is obtained, the recognition result is discarded, but does not include disclosure on a repetition request. Hence, Patent Document 1 does not solve the above problem, either, as with Non-Patent Document 1.

With this taken into consideration, the inventor has come to think of this disclosure with the knowledge that if recognition result with a low confidence level is not immediately discarded, but the recognition result and recognition result obtained through a repetition request are taken into consideration, the recognition accuracy can be improved even in the case where the speaker is a little child or under the environment where inputted speeches are strongly affected by noise.

A voice recognition method according to an aspect of the present disclosure is a voice recognition method including: receiving via a microphone a first speech that a speaker makes intending one word, the first speech including N phonemes, where N is a natural number of 2 or more; calculating occurrence probabilities of all kinds of phonemes for each of the N phonemes included in the first speech; recognizing a phoneme string, in which phonemes each having the highest probability are lined in order, to be a first phoneme string corresponding to the first speech, the phonemes corresponding to the respective N phonemes from a first phoneme to an N-th phoneme included in the first speech; calculating a first value by multiplying together occurrence probabilities that the N phonemes included in the first phoneme string have; if the first value is smaller than a first threshold, outputting a voice to prompt the speaker to repeat the one word, via a loudspeaker; receiving via the microphone a second speech that the speaker repeats intending the one word, the second speech including M phonemes, where M is a natural number of 2 or more; calculating occurrence probabilities of all kinds of phonemes for each of the M phonemes included in the second speech; recognizing a phoneme string, in which phonemes each having the highest probability are lined in order, to be a second phoneme string corresponding to the second speech, the phonemes corresponding to the respective M phonemes from a first phoneme to an M-th phoneme included in the second speech; calculating a second value by multiplying together occurrence probabilities that the M phonemes included in the second phoneme string have; if the second value is smaller than the first threshold, extracting a phoneme having occurrence probability higher than a second threshold out of the first phoneme string and a phoneme having occurrence probability higher than the second threshold out of the second phoneme string; extracting a word including the extracted phonemes from a dictionary stored in a memory, the dictionary associating words with respective phoneme strings; and if the number of extracted words is one, recognizing the extracted word to be the one word.

With this configuration, even if the first value of the first phoneme string obtained by recognizing the first speech intending one word is lower than the first threshold, and thus the reliability of the first phoneme string is low, the first phoneme string is not discarded. Then, if the second value of the second speech intending the one word obtained through the repetition request is lower than the first threshold, and thus the reliability of the second phoneme string is also low, phonemes having high reliability are extracted from both the first phoneme string and the second phoneme string and compared to the dictionary to extract a word corresponding to the one word.

As described above, with this configuration, even if recognition result having low reliability is obtained for a first speech, the recognition result is not discarded, and the recognition result is utilized if recognition result having low reliability is obtained for a second speech. Thus, even if a repetition request does not lead to acquisition of reliable recognition result, reliable phonemes selected out of the first phoneme string and the second phoneme string, which are both recognition results, are used to recognize the one word, which improves the accuracy in recognizing the one word.

Further, with this configuration, since a word including phonemes having high reliability out of the first phoneme string and the second phoneme string are extracted from the dictionary, it is possible to prevent acquisition of linguistically unnatural recognition result.

With these processes, this configuration improves the recognition accuracy even if the speaker is a little child or even under the environment where inputted speeches are strongly affected by noise.

In this configuration, the voice recognition method may further include: if the number of the extracted words is plural, outputting a voice to ask the speaker whether the speaker said each of the extracted words, via the loudspeaker; receiving an affirmative answer or a negative answer from the speaker via the microphone; and recognizing a word corresponding to the affirmative answer to be the one word.

According to this configuration, the recognition accuracy can be improved because if multiple words including phonemes having high reliability out of the first phoneme string and the second phoneme string are extracted from the dictionary, which of the words the speaker said is checked directly with the speaker.

A voice recognition method according to another aspect of the present disclosure is a voice recognition method including: receiving via a microphone a first speech that a speaker makes intending one word string, the first speech including N phonemes, where N is a natural number of 2 or more; calculating a confidence level X1 of a word string estimated for the first speech $$X1 = \max \prod_{t=1}^{T} P_{A1}(o_t, s_t | s_{t-1}) P_{L1}(s_t, s_{t-1})$$

where t is a number specifying one of frames constituting the first speech, T is the total number of the frames constituting the first speech, $P_{A1}(o_t, s_t | s_{t-1})$ is a probability that a certain phoneme appears at a t-th frame which is next to a phoneme string corresponding to a state $s_{t-1}$ of from a first frame to a (t−1)-th frame of the first speech, and the phoneme string corresponding to the state $s_{t-1}$ transitions to a phoneme string corresponding to a state $s_t$, $o_t$ is a physical quantity that is for estimating the certain phoneme and is obtained from the first speech, the certain phoneme is one of all kinds of phonemes, and $P_{L1}(s_t, s_{t-1})$ is a probability that a certain word appears at a t-th frame next to a word string corresponding to a state $s_{t-1}$, and the word string corresponding to the state $s_{t-1}$ transitions to a word string corresponding to a state $s_t$ in the first speech; determining whether the confidence level X1 is higher than or equal to a threshold; if the confidence level X1 is lower than the threshold, outputting a voice to prompt the speaker to repeat the one word string, via a loudspeaker; receiving via the microphone a second speech that the speaker repeats intending the one word string; if the confidence level X1 of the second speech is lower than the threshold, calculating a combined confidence level X for each of all word strings estimated from the first speech and the second speech $$X = \prod_{t=1}^{T} \{P_{A_1}(o_t, s_t | s_{t-1}) + P_{A_2}(q_t, s_t | s_{t-1})\} P_L(s_t, s_{t-1})$$

where t is a number specifying one of frames constituting the first speech and the second speech, T is the total number of the frames constituting the first speech and the second speech, $P_{A1}(o_t, s_t | s_{t-1})$ is a probability that a certain phoneme appears at a t-th frame, which is next to a phoneme string corresponding to a state $s_{t-1}$ of from a first frame to a (t−1)-th frame of the first speech, and the phoneme string corresponding to the state $s_{t-1}$ transitions to a phoneme string corresponding to a state $s_t$, $o_t$ is a physical quantity that is for estimating the certain phoneme and is obtained from the first speech, the certain phoneme is one of all kinds of phonemes, $P_{A2}(q_t, s_t | s_{t-1})$ is a probability that a certain phoneme appears at a t-th frame which is next to a phoneme string corresponding to a state $s_{t-1}$ of from a first frame to a (t−1)-th frame of the second speech, and the phoneme string corresponding to the state $s_{t-1}$ transitions to a phoneme string corresponding to a state $s_t$, $q_t$ is a physical quantity that is for estimating the certain phoneme and is obtained from the second speech, and $P_L(s_t, s_{t-1})$ is a probability that a certain word appears at a t-th frame next to a word string corresponding to the state $s_{t-1}$, and the word string corresponding to the state $s_{t-1}$ transitions to a word string corresponding to the state $s_t$ in the first speech; and recognizing a word string corresponding to the state $s_t$ that gives the largest value of the combined confidence levels X, as the one word string.

According to this configuration, the first speech intending the one word string is divided into T frames, and a word string that maximizes the product of probability $P_{A1}(o_t,s_t|s_{t-1})$ of phoneme strings transitioning from the state $s_{t-1}$, which is up to the (t−1)-th frame, to the state $s_t$, which is up to the t-th frame and probability $P_{L1}(s_t,s_{t-1})$ of the word string is recognized as the one word string.

Then, even if confidence level X1 of the word string for the first speech is lower than the threshold, and thus the reliability of the word string for the first speech is low, the word string of the first speech is not discarded. Then, if confidence level X1 of the word string for the second speech intending the one word string, obtained through the repetition request, is lower than the threshold, and thus the reliability of the word string for the second speech is also low, the sum of probability $P_{A1}(o_t,s_t|s_{t-1})$ of the phoneme string for the first speech and probability $P_{A2}(q_t,s_t|s_{t-1})$ of the phoneme string for the second speech in the state $s_t$ is calculated, and then the product of the sum and probability $P_L(s_t,s_{t-1})$ of the word string in the state $s_t$ is calculated as combined confidence level X. The word string that maximizes combined confidence level X is recognized as the one word.

As described above, with this configuration, even if recognition result having low reliability is obtained for a first speech, the recognition result is not discarded, and the recognition result is utilized if recognition result having low reliability is obtained for a second speech. Thus, even if a repetition request does not lead to acquisition of reliable recognition result, both recognition results are combined to recognize the one word string, which improves the accuracy in recognizing the one word string.

Further, with this configuration, since not only the probabilities of phoneme strings but also the probabilities of word strings are taken into consideration, it is possible to prevent acquisition of linguistically unnatural recognition result.

With these processes, this configuration improves the recognition accuracy even if the speaker is a little child or even under the environment where inputted speeches are strongly affected by noise.

A voice recognition method according to still another aspect of the present disclosure is a voice recognition method including: receiving via a microphone a first speech that a speaker makes intending one word string, the first speech including N phonemes, where N is a natural number of 2 or more; calculating a confidence level X1 of a word string estimated for the first speech $$X1 = \prod_{t1=1}^{T1} P_{A1}(o_{t1}, s_{t1} | s_{t1-1}) P_{L1}(s_{t1}, s_{t1-1})$$

where t1 is a number specifying one of frames constituting the first speech, T1 is the total number of the frames constituting the first speech, $P_{A1}(o_t,s_{t1}|s_{t1-1})$ is a probability that a certain phoneme appears at a t1-th frame which is next to a phoneme string corresponding to a state $s_{t1-1}$ of from a first frame to a (t1−1)-th frame of the first speech, and the phoneme string corresponding to the state $s_{t1-1}$ transitions to a phoneme string corresponding to a state $s_{t1}$, $o_{t1}$ is a physical quantity that is for estimating the certain phoneme and is obtained from the first speech, the certain phoneme is one of all kinds of phonemes, and $P_{L1}(s_{t1},s_{t1-1})$ is a probability that a certain word appears at a t1-th frame next to a word string corresponding to a state $s_{t1-1}$, and the word string corresponding to the state $s_{t1-1}$ transitions to a word string corresponding to a state $s_{t1}$ in the first speech; determining whether the largest value MaxX1 of the confidence levels X1 is higher than or equal to a threshold; if the largest value MaxX1 is smaller than the threshold, extracting first word strings that are estimated for the first speech and give top M values of the confidence levels X1, where M is a natural number of 2 or more; outputting a voice to prompt the speaker to repeat the one word string, via a loudspeaker; receiving the microphone a second speech that the speaker repeats intending the one word string; calculating a confidence level X2 for each one of all word strings estimated for the second speech $$X2 = \prod_{t2=1}^{T2} P_{A2}(o_{t2}, s_{t2} | s_{t2-1}) P_{L2}(s_{t2}, s_{t2-1})$$

where t2 is a number specifying one of frames constituting the second speech, T2 is the total number of the frames constituting the second speech, $P_{A2}(o_{t2},s_{t2}|s_{t2-1})$ is a probability that a certain phoneme appears at a t2-th frame which is next to a phoneme string corresponding to a state $s_{t2-1}$ of from a first frame to a (t2−1)-th frame of the second speech, and the phoneme string corresponding to the state $s_{t2-1}$ transitions to a phoneme string corresponding to a state $s_{t2}$, $o_{t2}$ is a physical quantity that is for estimating the certain phoneme and is obtained from the second speech, and $P_{L2}(s_2,s_{t2-1})$ is a probability that a certain word appears at a t2-th frame next to a word string corresponding to a state $s_{t2-1}$, and the word string corresponding to the state $s_{t2-1}$ transitions to a word string corresponding to a state $s_{t2}$ in the second speech; determining whether the largest value MaxX2 of the confidence levels X2 is larger than or equal to a threshold: if the largest value MaxX2 is lower than the threshold, extracting second word strings that are estimated for the second speech and give top M values of the confidence levels X2; and if there is a common word string between the first word strings and the second word strings, recognizing the common word string as the one word string.

According to this configuration, the first speech intending the one word string is divided into T frames, and the product of probability $P_{A1}(o_t,s_t|s_{t-1})$ of phoneme strings transitioning from the state $s_{t-1}$, which is up to the (t−1)-th frame, to the state $s_t$, which is up to the t-th frame and probability $P_{L1}(s_t,s_{t-1})$ of the word string is calculated as confidence level X1.

Then, if the largest value MaxX1 of confidence levels X1 is lower than the threshold, and thus the reliability of the word string recognized from the first speech is low, the first word strings having top M confidence levels X1 are extracted, and the second speech is obtained through a repetition request.

Then, if the largest value MaxX2 of confidence levels X2 of the word strings for the second speech is lower than the threshold, and thus the reliability of the word strings for the second speech is also low, the second word strings having top M confidence levels X2 are extracted. If there is a common word string between the first word string and the second word string, the common word string is recognized as the one word string.

As described above, with this configuration, even if recognition result having low reliability is obtained for a first speech, the recognition result is not discarded, and the recognition result is utilized if recognition result having low reliability is obtained for a second speech. Thus, even if a repetition request does not lead to acquisition of reliable recognition result, the word string recognized in both the first speech and the second speech is recognized as the word string of the one word, which improves the accuracy in recognizing the word string of the one word.

Further, with this configuration, since not only the probabilities of phoneme strings but also the probabilities of word strings are taken into consideration, it is possible to prevent acquisition of linguistically unnatural recognition result.

With these processes, this configuration improves the recognition accuracy even if the speaker is a little child or even under the environment where inputted speeches are strongly affected by noise.

The voice recognition method described above may be applied to robots.

The present disclosure can be implemented not only as a voice recognition method that executes the characteristic processing described above but also as a voice recognition device including a processor that executes characteristic steps included in the voice recognition method, for example. The present disclosure can be also implemented as a computer program that causes a computer to execute characteristic steps included in the voice recognition method. Then, it goes without saying that such a computer program can be distributed via a non-transitory computer-readable recording medium, such as a CD-ROM, or a communication network, such as the Internet.

Hereinafter, with reference to the drawings, embodiments of the present disclosure will be described. Note that each of the embodiments described below illustrates a specific example of the present disclosure. Numerical values, shapes, constituents, steps, orders of steps, and the like in the following embodiments are mere examples and are not intended to limit the present disclosure. In addition, of the constituents in the following embodiments, the constituents that do not appear in independent claims, which show the highest concepts, are described as optional. In all the embodiments, contents of the embodiments may be combined.

Embodiment 1

FIG. 1 is a diagram illustrating an example of the overall configuration of a voice dialogue system in Embodiment 1. The voice dialogue system illustrated in FIG. 1 includes a voice recognition device 100, microphone 400, loudspeaker 410, service application server 420, and controlled device 430.

The voice recognition device 100 includes a central processing unit (CPU) 20, which is a processor, and a memory 30. The CPU 20 includes a voice recognizer 200, word confidence level determiner 210, intention interpreter 220, action selector 230, response generator 240, voice synthesizer 250, and speech extractor 260. The memory 30 includes a word dictionary 301 and a recognition result storage 302. The voice recognizer 200 includes a phoneme estimator 201, word estimator 202, and phoneme occurrence probability determiner 203.

The word dictionary 301 stores combinations of words and phoneme strings that can be recognized by the voice recognition device 100. FIG. 7 is a diagram illustrating an example of data structure of the word dictionary. In the word dictionary, words, such as "Curry" and "Carry", and the phoneme strings of the words, such as "K AH1 R IY0" and "K AE1 R IY0", are stored with those associated with each other.

Returning to FIG. 1, a program that causes a computer to function as the voice recognition device 100 is stored in the memory 30 incorporated in a robot or a terminal in which the voice recognition device 100 is implemented. The program is executed by a processor such as the CPU 20. All the constituents included in the voice recognition device 100 may be implemented in one terminal, or alternatively the constituents may be separately implemented in another terminal or a server that is connected via a certain network, such as optical fibers, wireless, or public telephone lines. Voice dialogue processing may be provided by the voice recognition device 100 and another terminal or a server communicating with each other.

The microphone 400 is, for example, a directional microphone and is incorporated in the terminal or robot in which the voice recognition device 100 is implemented. The microphone 400 may be any sound pickup device, such as a handheld microphone, pin microphone, or desktop microphone, for example. In this case, the microphone 400 is connected via wired or wireless communication to the terminal in which the voice recognition device 100 is implemented. Alternatively, the microphone 400 may be a microphone mounted on a device such as a smartphone or tablet terminal, having sound pickup and communication functions.

The loudspeaker 410 may be incorporated in the terminal or robot in which the voice recognition device 100 is implemented or may be connected via wired or wireless communication to the terminal or robot in which the voice recognition device 100 is implemented. Alternatively, the loudspeaker 410 may be a loudspeaker mounted on a device such as a smartphone or tablet terminal, having sound pickup and communication functions.

The service application server 420 is a cloud server that provides users with multiple services, such as weather, storytelling, news, and games, via a network. For example, the service application server 420 acquires voice recognition result performed by the voice recognition device 100 and determines a service to be performed, in accordance with the recognition result. Services provided by the service application server 420 may be implemented with a program having a function of acquiring execution results in the service application server 420 via a network, or may be implemented with programs stored in both the service application server 420 and a memory on the robot or terminal in which the voice recognition device 100 is implemented.

The controlled device 430 is an appliance, such as a television set or an air conditioner that are connected to the voice recognition device 100 via wired or wireless communication and controlled by receiving voice recognition result from the voice recognition device 100.

The speech extractor 260 extracts speech sound signals from the sound signals outputted from the microphone 400 and outputs them to the phoneme estimator 201. Here, the speech extractor 260 detects a start of speech, for example, when sound larger than or equal to a specified sound level has continued for a specified period or more, and starts outputting the sound signal, inputted from the microphone 400, to the phoneme estimator 201. When the speech extractor 260 detects that sound smaller than a specified sound level has continued for a specified period or more, the speech extractor 260 stops outputting the sound signal to the phoneme estimator 201. In this embodiment, the speech extractor 260 extracts a sound signal of a voice that a speaker utters intending one word. It is assumed that the speaker is a little child in the language learning stage.

The phoneme estimator 201 divides the sound signal inputted from the speech extractor 260 into multiple sound sections each having a specified time unit and calculates the occurrence probability of each of all kinds of phonemes for each phoneme section. A phoneme means a minimum unit of speech sound in language and is represented by a symbol such as "AA" or "AE". All kinds of phonemes mean all the phonemes used for speech. All kinds of phonemes here are modeled by acoustic models. Examples of acoustic models include Hidden Markov Models (HMM), for example.

Although the number of kinds of phonemes differs depending on the language, it is 39 for English, for example, according to the CMU dictionary (http://www.speech.cs.cmu.edu/cgi-bin/cmudict?in=good+morning&stress=-s#phones). Here, the phoneme estimator 201 may combine consecutive common phoneme sections as a single phoneme section by using HMM to estimate a phoneme string. Then, the phoneme estimator 201 estimates that a combination of phonemes that maximizes the product of occurrence probabilities in all the phoneme sections is the phoneme string uttered by the speaker.

The word estimator 202 extracts a word that most matches the phoneme string estimated by the phoneme estimator 201, from the word dictionary 301, and estimates the extracted word to be a word spoken by the speaker.

FIG. 2 is a diagram illustrating an example of occurrence probabilities calculated for every phoneme in a speech including two phonemes. FIG. 3 is a diagram in which the products of occurrence probabilities of combinations of phonemes at the first phoneme and phonemes at the second phoneme in FIG. 2 are organized.

For example, it is assumed that a word including two phonemes is spoken and that the occurrence probabilities of the phonemes indicated in FIG. 2 are obtained. In FIG. 2, occurrence probabilities of phonemes "V" and "B" are calculated to be "0.4" and "0.5", respectively, for the first phoneme, and occurrence probabilities of phonemes "IY1" and "AW1" are calculated to be "0.3" and "0.6", respectively, for the second phoneme.

In this case, four phoneme combinations of the first phoneme and the second phoneme "VIY1", "VAW1", "BIY1", and "BAW1" are obtained, and the products of the occurrence probabilities of the combinations are "0.12", "0.24", "0.15", and "0.30".

Thus, the combination that maximizes the product of occurrence probabilities of phonemes at the first phoneme and the second phoneme is "BAW1", the occurrence probability of which is "0.30". In this case, the word dictionary 301 is searched for the phoneme string "BAW1", and a word matching the phoneme string "BAW1" is outputted as recognition result. The product of the occurrence probabilities of the phonemes at this time, in other words, "BAW1"="0.30" is the confidence level of the recognized word.

The word confidence level determiner 210 compares the confidence level (an example of a first value and a second value) of the word recognized by the word estimator 202 with a specified threshold TH1 (an example of a first threshold). If the confidence level of the word is lower than threshold TH1, the word confidence level determiner 210 stores recognition result including the phoneme string of the word recognized by the word estimator 202 and the occurrence probabilities of the phonemes into the recognition result storage 302 as first recognition result for the first speech. In this case, the word confidence level determiner 210 outputs an instruction to generate a voice to prompt repetition of the speech to the response generator 240 in order to get the speaker to speak the one word again.

When the speaker makes the second speech intending the one word as repetition of the speech, and the word estimator 202 obtains second recognition result, the word confidence level determiner 210 determines whether the confidence level of the second recognition result is lower than threshold TH1.

If the word confidence level determiner 210 determines that the confidence level of the second recognition result is lower than threshold TH1, the phoneme occurrence probability determiner 203 extracts phonemes the occurrence probabilities of which are higher than or equal to threshold TH2 from both the word recognized in the first recognition result and the word recognized in the second recognition result.

The word estimator 202 extracts a word including the phoneme string extracted by the phoneme occurrence probability determiner 203 from the word dictionary 301 and determines the word as the final recognition result based on the extraction result.

If the confidence level of the word is higher than threshold TH1, the word confidence level determiner 210 outputs the recognition result to the intention interpreter 220.

The intention interpreter 220 estimates the type of response (for example, back-channel feedback, or an answer to a question) and the type of action (a word game, hide and seek, or control of a television set) from the recognition result. Then, the intention interpreter 220 outputs estimation result of the type of response to the response generator 240 while outputting estimation result of the type of action to the action selector 230.

The action selector 230 determines a service to be performed or a controlled device 430 to be controlled from the estimation result by the intention interpreter 220. Then, if the action selector 230 determines to perform a service, the action selector 230 transmits a provision request for the service to be performed to the service application server 420. If the action selector 230 determines to control the controlled device 430, the action selector 230 outputs a control instruction to the controlled device 430 to be controlled.

When the response generator 240 receives the estimation result of the type of response from the intention interpreter 220, the response generator 240 generates a response sentence corresponding to the estimation result. When the response generator 240 receives an instruction to generate a voice to prompt repetition of the speech from the word confidence level determiner 210, the response generator 240 generates a response sentence for asking the speaker to repeat the one word.

The voice synthesizer 250 converts the response sentence generated by the response generator 240 into a sound signal and outputs the sound signal to the loudspeaker 410. The loudspeaker 410 converts the sound signal outputted from the voice synthesizer 250 into sound and outputs the sound to the outside.

Figure 4:
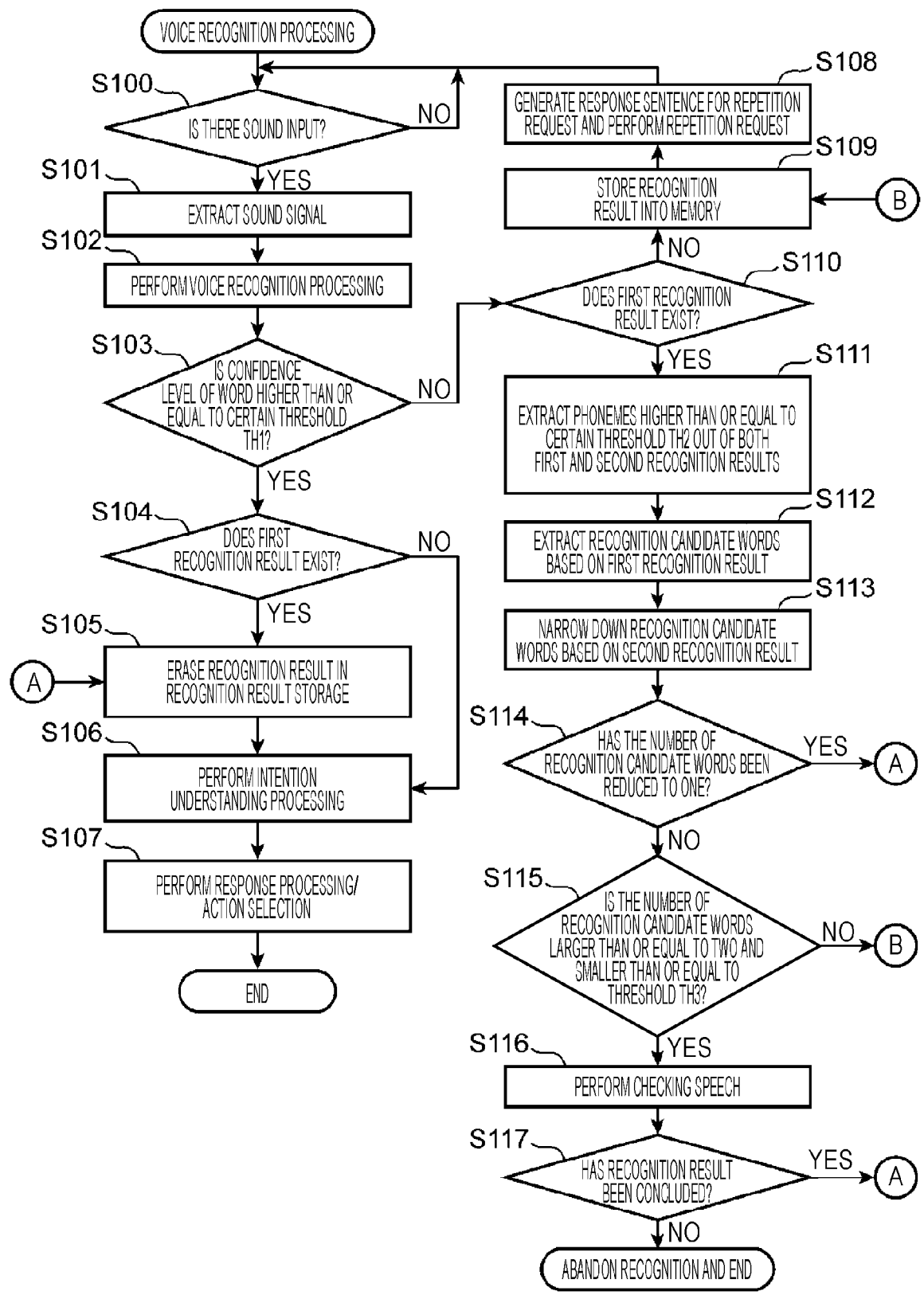
FIG. 4 is a flowchart illustrating an example of recognition processing in Embodiment 1.

FIG. 4 is a flowchart illustrating an example of recognition processing in Embodiment 1. First, the speech extractor 260 determines whether there is a sound input at the microphone 400 (step S100). If it is determined that there is no sound input (NO at step S100), the processing at step S100 is repeated until there is a sound input.

On the other hand, if it is determined that there is a sound input (YES at step S100), the speech extractor 260 extracts a speech sound signal from the sound signal outputted from the microphone 400 (step S101).

Next, the voice recognizer 200 performs voice recognition processing (step S102). Specifically, the phoneme estimator 201 divides the sound signal extracted from the speech extractor 260 into multiple sound sections, generates a feature amount for the sound signal of each sound section, and matches the generated feature amount with the acoustic models to estimate a phoneme for each sound section. At this time, the phoneme estimator 201 calculates the occurrence probabilities of the phonemes for every sound section and combines sound sections of consecutive identical phonemes into one, using HMM. For example, assuming that a speech sound includes a first phoneme, second phoneme, and third phoneme, the phoneme estimator 201 calculates occurrence probabilities of all kinds of phonemes for each of the first phoneme, second phoneme, and third phoneme.

For example, the occurrence probability of each of all kinds of phonemes is calculated for the first phoneme in this way. The probability of the phoneme "AA" is "0.4"; the phoneme "AE", "0.1"; the phoneme "AH", "0.2"; and so on. Also, for the second phoneme and the third phoneme, the occurrence probability of each of all kinds of phonemes is calculated in the same way as for the first phoneme.

Then, the phoneme estimator 201 estimates that a combination of three phonemes that maximizes the product of the occurrence probabilities of the first phoneme, second phoneme, and third phoneme is the phoneme string of the speech sound.

Next, the word estimator 202 refers to the word dictionary 301 stored in the memory 30 to select a word that matches the phoneme string estimated by the phoneme estimator 201. If there is no word matching the phoneme string in the word dictionary 301, the word estimator 202 makes the phoneme estimator 201 estimate the phoneme string of the word for which the product of occurrence probabilities of the phonemes is the second largest. Then, the word estimator 202 searches the word dictionary 301 for a word matching the estimated phoneme string. When a matched word is obtained from the word dictionary 301 in this way, the word estimator 202 employs the product of the occurrence probabilities of the phonemes in the matched word as the confidence level of the word, and outputs the phoneme string of the matched word and the occurrence probabilities of the phonemes included in the phoneme string as the recognition result to the word confidence level determiner 210.

Next, the word confidence level determiner 210 determines whether the confidence level of the recognized word is higher than or equal to threshold TH1 (step S103). If the confidence level of the word is higher than or equal to threshold TH1 (YES at step S103), the word confidence level determiner 210 determines whether first recognition result is stored in the recognition result storage 302 (step S104). Here, the first recognition result means the recognition result of a voice spoken before the voice is obtained at step S101, the recognition result being stored in the recognition result storage 302.

In other words, in the case where the confidence level of the word recognized in the last speech is lower than threshold TH1, and the recognition result for the speech has been stored in the recognition result storage 302, this recognition result is first recognition result.

If first recognition result is stored (YES at step S104), the word confidence level determiner 210 erases the first recognition result stored in the recognition result storage 302 (step S105) and outputs the recognition result to the intention interpreter 220. Next, the intention interpreter 220 performs intention understanding processing based on the recognition result (step S106).

On the other hand, if first recognition result is not stored in the recognition result storage 302 (NO at step S104), the process moves to step S106. At step S106, the intention interpreter 220 estimates the type of response and the type of action from the recognition result. At step S107, the response generator 240 generates a response sentence corresponding to the estimated type of response. In addition, at step S107, the action selector 230 determines a service to be performed or a controlled device 430 to be controlled based on the estimated type of action. If a service is determined, the action selector 230 transmits a provision request for the service to the service application server 420. If a controlled device 430 is determined, the action selector 230 outputs a control instruction to the controlled device 430 to be controlled.

On the other hand, if the confidence level of the recognized word is lower than threshold TH1 (NO at step S103), the word confidence level determiner 210 refers to the recognition result storage 302 to determine whether first recognition result is stored therein (step S110). If first recognition result is not stored (NO at step S110), the word confidence level determiner 210 stores the phoneme string of the word estimated by the word estimator 202 and the occurrence probabilities of the phonemes into the recognition result storage 302 as the recognition result for the first speech (first recognition result) (step S109), and the word confidence level determiner 210 outputs an instruction to generate a voice to prompt repetition of the speech, to the response generator 240.

Next, the response generator 240 generates a response sentence for a repetition request, such as "Please speak slowly again?" and makes the voice recognizer 200 generate a sound signal for the generated response sentence and output the sound of the generated sound signal from the loudspeaker 410 (step S108). When the sound of the response sentence for the repetition request is outputted at step S108, the voice recognition device 100 is put into a standby state for waiting for the speaker to repeat the speech intending the one word, and the process returns to step S100.

When the speaker performs a second speech through this repetition request, second recognition result is obtained for the second speech in the same way as for the first speech through the processing from step S100 to step S102. Then, if the confidence level of the second recognition result is lower than threshold TH1, determination result at step S103 is NO, and the process proceeds to step S110.

On the other hand, if the confidence level of the second recognition result is higher or equal to threshold TH1 (YES at step S103), the second recognition result is determined to be the word that the speaker intends, and the processing from step S105 to step S107 is executed.

In the case where first recognition result is stored in the recognition result storage 302 at step S110 (YES at step S110), the phoneme occurrence probability determiner 203 extracts phonemes having occurrence probabilities higher than or equal to a specified threshold TH2 (an example of a second threshold) from each of the first recognition result stored in the recognition result storage 302 and the second recognition result for the repetition of the speech by the speaker, obtained at step S102 (step S111).

Next, the word estimator 202 refers to the word dictionary 301 to extract words including phonemes having occurrence probabilities higher than or equal to threshold TH2 in the phoneme string of the first recognition result, as recognition candidate words (step S112). Next, the word estimator 202 narrows down the recognition candidate words by choosing the words including phonemes having occurrence probabilities higher than or equal to threshold TH2 in the phoneme string of the second recognition result, from the list of the recognition candidate words extracted at step S112 (step S113).

FIG. 5 is a diagram illustrating an example of a dialogue in Embodiment 1. In FIG. 5, the word "ROBO" indicates a robot in which the voice recognition device 100 is implemented, and the numbers attached after the "ROBO" indicate the order of speeches. The word "CHILD" indicates a little child who talks with the robot, and the numbers attached after the "CHILD" indicate the order of speeches.

First, the robot says to the little child, "What is your favorite food?" (ROBO1). Responding to it, the little child says, "Curry" (CHILD1). However, in this case, because the confidence level of the word recognized for the speech "Curry" (CHILD1) is low, the robot performs a repetition request at step S108.

With this repetition request, the little child repeats the speech "Curry" (CHILD2), but the confidence level for this repeated speech is also low. Processing of the voice recognition device 100 in this case will be described below using FIGS. 6, 7, and 8.

FIG. 6 is a diagram illustrating an example of the first recognition result and the second recognition result for the dialogue example in FIG. 5. As illustrated in FIG. 6, the word "Sherry" is recognized for the little child's speech "Curry" in the first recognition result, and the confidence level of this word is lower than threshold TH1. Thus, the first recognition result is stored in the recognition result storage 302. As shown in the breakdown of the first recognition result in FIG. 6, the recognized word is "Sherry", the recognized phoneme string is "SH", . . . , "IY0", and the occurrence probabilities of the phonemes are "0.2", . . . , and "0.8".

Since the confidence level of the first recognition result is low, the robot makes a repetition request by saying, "Please speak slowly again." Then, the little child says again, "Curry", but "Color" is recognized as the second recognition result, and the confidence level is also lower than or equal to threshold TH1 in the second recognition result. As shown in the breakdown of the second recognition result in FIG. 6, the recognized word is "Color", the recognized phoneme string is "K", . . . , "ER0", and the occurrence probabilities of the phonemes are "0.8", . . . , and "0.2".

Here, threshold TH2, which is a threshold for the occurrence probability of a phoneme, is defined to be 0.7. In this case, the phoneme occurrence probability determiner 203 extracts phoneme "R" and phoneme "IY0", the occurrence probabilities of which are higher than or equal to 0.7, out of the first recognition result. The phoneme occurrence probability determiner 203 also extracts phoneme "K" and phoneme "AH1", the occurrence probabilities of which are higher than or equal to 0.7, out of the second recognition result.

Next, the word estimator 202 refers to the word dictionary 301 to extract words including the phoneme string of consecutive "R" and "IY0" extracted from the first recognition result, as recognition candidate words. Of the words listed in FIG. 7 as an example, the words including the phoneme string of the consecutive phonemes "RIY0" are "Curry", "Carry", "Sherry", and "Curry rice".

Hence, as illustrated in FIG. 8, the word estimator 202 extracts "Curry", "Carry", "Sherry", and "Curry rice" as recognition candidate words. FIG. 8 is a diagram illustrating an example of the recognition candidate words extracted from the first recognition result.

Further, the word estimator 202 extracts the words including the phoneme string of the consecutive phonemes "KAH1" extracted from the second recognition result out of the extracted recognition candidate words, to narrow down the recognition candidate words. Of the recognition candidate words listed in FIG. 8 as an example, the words including the phoneme string of the consecutive phonemes "KAH1" are "Curry", and "Curry rice".

Accordingly, the word estimator 202 selects "Curry" and "Curry rice" as final recognition candidate words at step S113.

Assuming that threshold TH3 is 3 at step S115 in FIG. 4, because the number of the final narrowed recognition candidate words is 2, the word estimator 202 makes a determination of YES at step S115. At step S116, the word estimator 202 makes the voice synthesizer 250 generate sound signals for checking speeches, such as "Did you say, 'Curry'?" and "Did you say, 'Curry rice'?", to check the recognition candidate words one by one and outputs the sound signals from the loudspeaker 410.

Responding to the checking speeches, the speaker makes, for example, an affirmative speech (for example, "Yes") or a negative speech (for example, "No"). When the word estimator 202 recognizes an affirmative speech as a response to the checking speech, the word estimator 202 recognizes the word corresponding the checking speech as a speech intending the one word. On the other hand, when the word estimator 202 recognizes a negative speech as a response to the checking speech, the word estimator 202 performs a checking speech for the next recognition candidate word.

FIG. 9 is a diagram illustrating another example of processing to narrow down recognition candidate words from the first recognition result and the second recognition result in Embodiment 1. The example in FIG. 9 illustrates a narrowing method for the case where phonemes having occurrence probabilities higher than or equal to threshold TH2 are not consecutive in the first recognition result and the second recognition result.

The dialogue example of FIG. 9 is the same as that of FIG. 5. In the example of FIG. 9, the first recognition result in which the word "Car" is recognized for a speech "Curry" and the second recognition result in which the word "Sherry" is recognized for a repetition speech "Curry" are obtained. Then, in the example of FIG. 9, because the confidence level of either the first recognition result or the second recognition result is lower than threshold TH1=0.7, processing to narrow down recognition candidate words is performed using the word "Car" and the word "Sherry".

As illustrated in FIG. 9, the phonemes having occurrence probabilities higher than or equal to threshold TH2=0.7 are "K" and "R" in the first recognition result, and as for the order of the phonemes, "K" precedes "R". In the second recognition result, the phoneme having an occurrence probability higher than or equal to threshold TH2=0.7 is "IY0".

Then, in the example of FIG. 9, the word estimator 202 extracts words in which phonemes including "K" and "R" are lined such that "K" precedes "R" regardless of whether there is a phoneme between "K" and "R", as recognition candidate words from the word dictionary 301. Next, the phoneme occurrence probability determiner 203 extracts the words including phoneme "IY0" out of the extracted recognition candidate words to further narrow down the recognition candidate words.

Returning to FIG. 4, if the number of the narrowed recognition candidate words is reduced to one at step S114 (YES at step S114), the word estimator 202 determines the selected word as the recognition result and moves the process to step S105, then the processing from step S105 onward is executed.

On the other hand, if the number of the narrowed recognition candidate words is not reduced to one (NO at step S114), the phoneme occurrence probability determiner 203 determines whether the number of the narrowed recognition candidate words is reduced to a number larger than or equal to two and smaller than or equal to threshold TH3 (step S115). If the number of the narrowed recognition candidate words is larger than or equal to two and smaller than or equal to threshold TH3 (YES at step S115), the word estimator 202 instructs the voice synthesizer 250 to perform a checking speech to check each of the narrowed recognition candidate words one by one with the speaker (step S116). Examples of the checking speech include, for example, a speech "Did you say 'Curry'?" for the case where the narrowed recognition candidate words include "Curry".

If the speaker makes an affirmative speech, such as "Yes" or "I did" in response to a checking speech, the word estimator 202 concludes the recognition candidate word that was affirmed to be the recognition result. If the recognition result is concluded at step S117 (YES at step S117), the process moves to step S105, and the processing from step S105 onward is executed.

On the other hand, if the number of recognition candidate words is not reduced to a number larger than or equal to 2 and smaller than or equal to threshold TH3 (NO at step S115), the process moves to step S109, where the word estimator 202 stores the second recognition result into the recognition result storage 302 of the memory 30. At this time, if the same recognition result in the past exists, the recognition result is overwritten on the past recognition result. At that time, the word estimator 202 may put all the narrowed recognition candidate words into the second recognition result and store this second recognition result into the recognition result storage 302.

Meanwhile, if no affirmative speech is made to any of the recognition candidate words at step S116, and the recognition result is not concluded (NO at step S117), the phoneme occurrence probability determiner 203 abandons the recognition and terminates the processing.

As described above, according to the voice recognition device 100 in Embodiment 1, even if recognition result having low reliability is obtained from a first speech, the recognition result is not discarded, and the recognition result is utilized if recognition result having low reliability is obtained from a second speech. Thus, even when a repetition request does not lead to acquisition of reliable recognition result, reliable phonemes selected out of the phoneme string included in the first recognition result and the phoneme string included in the second recognition result are used to recognize the one word. As a result, the accuracy in recognizing one word can be improved.

Note that if the recognition results are not narrowed down into one, using the first recognition result and the second recognition result, in other words, if determination result at step S115 is NO, and the second recognition result is stored into the recognition result storage 302 (step S109), the voice recognition device 100 may acquire a third recognition result by making a further repetition request. Then, if the confidence level of the third recognition result is lower than threshold TH1, the phoneme occurrence probability determiner 203 may perform a narrowing process using the first, second, and third recognition results. In this case, the phoneme occurrence probability determiner 203 may further narrows down the recognition candidate words that have been narrowed down using the first and second recognition results, by selecting the words including the phonemes the occurrence probabilities of which are higher than or equal to threshold TH2 out of the phoneme string recognized in the third recognition result. If the number of recognition candidate words does not become lower than or equal to threshold TH3 even with this process, the phoneme occurrence probability determiner 203 may make a further repetition request and repeat the repetition request until the number of recognition candidate words becomes lower than or equal to threshold TH3.

Embodiment 2

Figure 10:
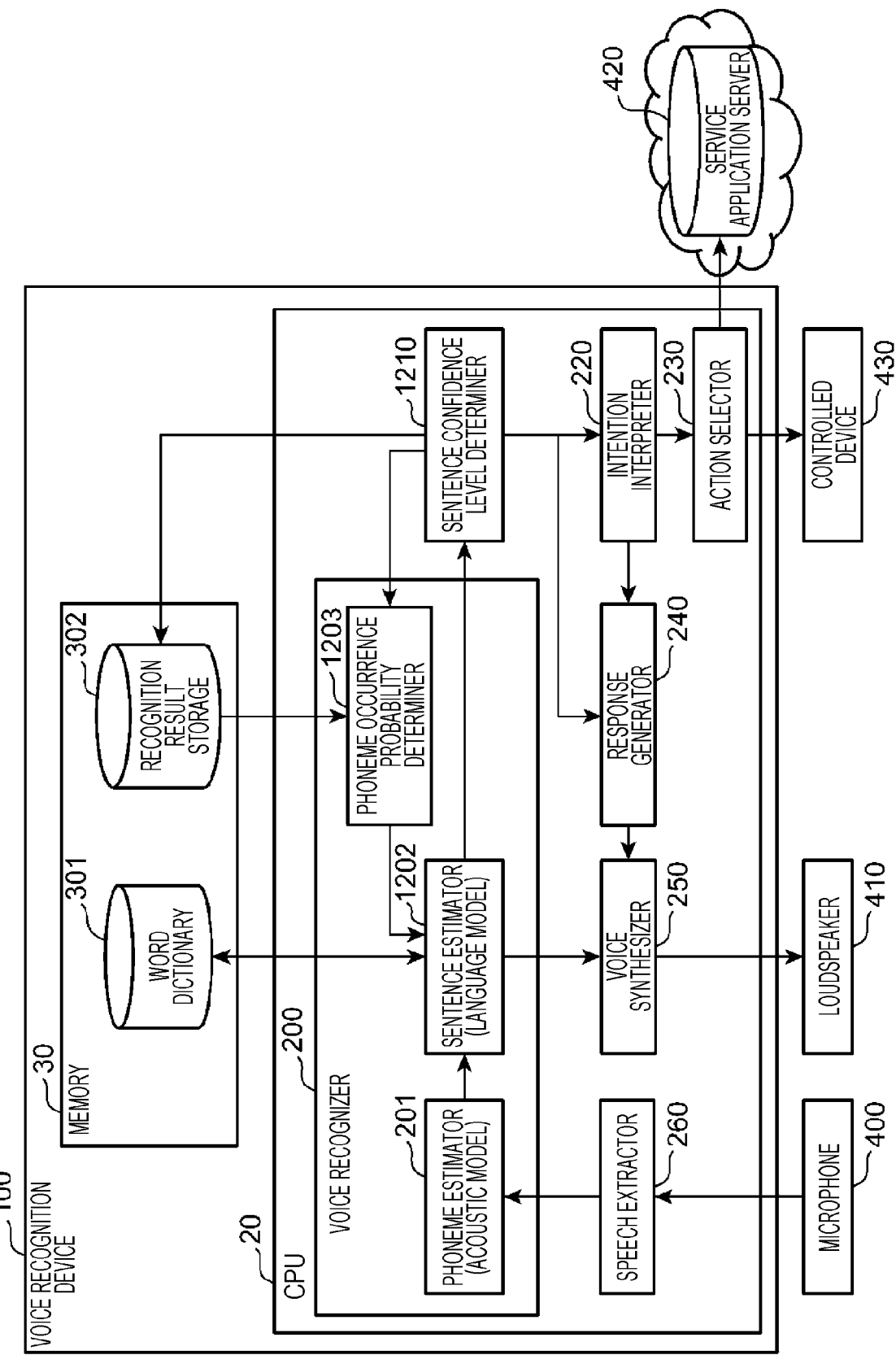
FIG. 10 is a diagram illustrating an example of the overall configuration of a voice dialogue system in Embodiment 2.

FIG. 10 is a diagram illustrating an example of the overall configuration of a voice dialogue system in Embodiment 2. FIG. 10 is different from FIG. 1 in that the word estimator 202, phoneme occurrence probability determiner 203, and word confidence level determiner 210 are replaced with a sentence estimator 1202, phoneme occurrence probability combiner 1203, and sentence confidence level determiner 1210.

The voice recognizer 200 in Embodiment 1 has a configuration capable of recognizing only one word as a sound, while the voice recognizer 200 in Embodiment 2 has a configuration capable of recognizing a sentence (word string) including any words.

The phoneme estimator 201 estimates a phoneme string by using Hidden Markov Models (HMM), and the sentence estimator 1202 estimate a sentence (word string) by using a finite state grammar or an n-gram.

Combination of HMM and a finite state grammar or an n-gram constitutes a search space of a directed graph in which multiple phonemes are connected in the form of a network. Thus, voice recognition processing comes down to a problem of network route search. In other words, the voice recognition processing is processing to find a network route most matching an inputted sound signal and obtain a word string corresponding to the route as the recognition result. Specifically, the voice recognition processing is processing to obtain word string W(S) that maximizes the product of occurrence probabilities of the phonemes and the words in the following Formula (2).

$$W \cong \operatorname*{argmax}_{w(s)} \prod_{t=1}^{T} P_A(o_t, s_t | s_{t-1}) P_L(s_t, s_{t-1}) \qquad (2)$$

Figure 11:
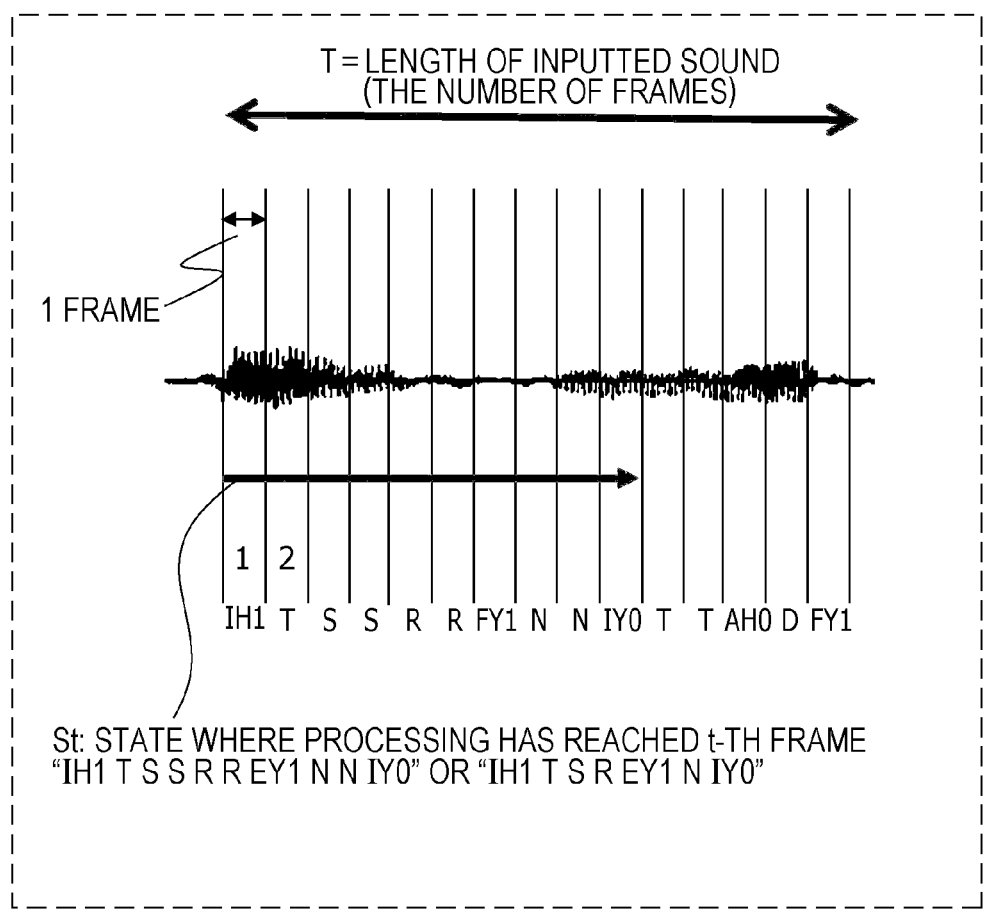
FIG. 11 is a diagram illustrating an example of a sound signal, which is divided into multiple frames.

FIG. 11 is a diagram illustrating an example of a sound signal, which is divided into multiple frames. As illustrated in FIG. 11, the frames are what an inputted sound signal is divided into at certain time intervals, for example, every 25 msec. Symbol $o_t$ represents the feature vector in the t-th frame. The feature vector is an example of a physical quantity used to estimate phonemes and is obtained from the sound level of a sound signal. T is the number of frames indicating the length of an inputted sound signal. For the feature vector, for example, Mel-Frequency Cepstrum Coefficients can be employed. Symbol $s_t$ represent the state where processing has reached the t-th frame.

In FIG. 11, the rightward arrow 1101 indicates state $s_t$. As for the phoneme string, in state $s_t$, a phoneme string "IH1 T S S R R EY1 N N IY0" or "IH1 T S R EY1 N IY0" is estimated. Note that "IH1 T S S R R EY1 N N IY0" and "IH1 T S R EY1 N IY0" depend on the difference of the acoustic model. In the case where the phoneme estimator 201 uses an acoustic model in which consecutive identical phonemes are combined, the estimation result of state $s_t$ is the latter. For the sake of simplicity, hereinafter description will be provided using an acoustic model of one phoneme per frame.

As for the word string, in state $s_t$, a word string "It's" is estimated. Thus, $P_A(o_t,s_t|s_{t-1})$ represent the probability of transitioning from the phoneme string corresponding to state $s_{t-1}$ to the phoneme string corresponding to state $s_t$ (the occurrence probability of the phoneme string). $P_L(s_t,s_{t-1})$ represents the probability of the language model of transitioning from the word string corresponding to state $s_{t-1}$ to the word string corresponding to state $s_t$ (the occurrence probability of the word string). Note that occurrence probability $P_L(s_t,s_{t-1})$ of the word string is applied when state $s_{t-1}$ and state $s_t$ indicates a boundary of words. Occurrence probability $P_L(s_t,s_{t-1})$ of the word string is 1 at positions other than boundaries of words. W(S) represents state transition process S, in other words, the word string corresponding to state $s_t$.

The word string as final estimation for a sound signal of an inputted speech corresponds to the phoneme string from the first frame to the t-th frame. The phoneme string is estimated in order from the beginning, like from the first frame, then, the second frame, . . . , and the t-th frame. When a speech occurs, the phoneme estimator 201 first estimates as many phoneme strings as possible for the sound signal of the speech. The phoneme strings that can be estimated include, in addition to the phoneme string for the entire speech, the consecutive phoneme strings from the beginning of the speech to middles of the speech, such as the phoneme string for the first frame, the phoneme string for the first frame to the second frame, the phoneme string for the first frame to the third frame, and so on.

Next, the sentence estimator 1202 assigns as many assignable words as possible to the estimated phoneme strings. Then, the sentence estimator 1202 multiplies the occurrence probability of each estimated phoneme string by the occurrence probability of assigned words and determines the combination of a phoneme string and the words that make the largest value as the final estimation of the word string. Here, the product of the occurrence probability of an estimated phoneme string and the occurrence probabilities of estimated words indicates the confidence level of the word string constituted of the estimated phoneme string and the words assigned thereto. Hereinafter, a specific example will be described.

When a speech "It's rainy" is given, the phoneme estimator 201 estimates phoneme strings in order from state $s_1$, in other words, from the phoneme string (in this case, the phoneme) of the first frame, to the phoneme string of state $s_9$ of the entire speech (here, from the first frame to the ninth frame because T=9), and calculates the occurrence probability for each of the estimated phoneme strings.

In the case where the phoneme string of state $s_1$ is estimated to be "IH1", the phoneme string of state $s_2$, in other words, the phoneme string up to the second frame is estimated to be, for example, "IH1T". Then, occurrence probability $P_A(o_2,s_2|s_1)$, which is occurrence probability of the phoneme string up to the second frame in this case, represents the probability that the phoneme "T" appears after the phoneme "IH1".

Only the phoneme string "IH1T" is not the candidate for the phoneme string of state $s_2$, but the candidates exist in the same number as that of all the phonemes. However, the occurrence probability of a phoneme string varies depending on the feature of a voice actually spoken. Here, since the speech "It's rainy" is given, as for the phoneme string of state $s_2$, occurrence probability $P_A$ of the phoneme string "IH1T" is higher than occurrence probability $P_A$ of the phoneme string "IH1TH". In the same way as above, as for the phoneme string of state $s_{10}$, occurrence probability $P_A$ of the phoneme string "IH1 T S R EY1 N IY0" is higher than occurrence probability $P_A$ of the phoneme string "IH1 T S R EH1 D IY0".

The sentence estimator 1202, first, assigns words to the phoneme string estimated by the phoneme estimator 201. For example, in the case where the phoneme string of state $s_{10}$ is estimated to be "IH1 T S R EY1 N IY0", words "It's rainy" are assigned. Next, the sentence estimator 1202 calculates occurrence probability $P_L(s_t,s_{t-1})$ of the word string by using the occurrence probability of each word determined by a language model such as n-gram for each of the assigned words. For example, in the case where the sentence estimator 1202 utilizes a 2-gram language model, word occurrence probability $P_L(s_t,s_{t-1})$ for "It's rainy" means the probability that "rainy" appears next to "It's", and word occurrence probability $P_L(s_t,s_{t-1})$ for "It's ready" means the probability that "ready" appears next to "It's".

The occurrence probabilities of these words are stored in the word dictionary 301. As for the word occurrence probability for the phoneme string "IH1 T S R EY1 N IY0" of state $s_{10}$, if the word occurrence probability of "It's rainy" is higher than the word occurrence probability of "It's ready", word occurrence probability $P_L(s_t,s_{t-1})$ for "It's rainy today" will be higher than word occurrence probability $P_L(s_t,s_{t-1})$ for "It's ready today". Here, although description has been provided for an example of 2-gram, the calculation of word occurrence probability is the same regardless of which n-gram (n is a natural number) is utilized.

The sentence confidence level determiner 1210 multiplies together occurrence probability $P_A(o_t,s_t|s_{t-1})$ of the phoneme string estimated by the phoneme estimator 201 and occurrence probabilities $P_L(s_t,s_{t-1})$ of multiple word strings assigned to each of all the phoneme strings estimated by the sentence estimator 1202, to calculate the confidence levels of the multiple word strings. Then, the sentence confidence level determiner 1210 recognizes the word string having the highest confidence level out of the multiple confidence levels as the final recognized word string. In other words, the sentence estimator 1202 recognizes W(s) in Formula (2) as the finally recognized word string.

The phoneme occurrence probability combiner 1203 combines the occurrence probabilities of each phoneme by summing the occurrence probability of each phoneme in the first speech and the occurrence probability of each phoneme in the second speech. Note that when the occurrence probabilities of each phoneme are combined, the sentence estimator 1202 uses the combined occurrence probability of each phoneme to calculate the confidence levels of multiple word strings by using the same approach as used for the first speech. Then, the sentence estimator 1202 selects the word string having the highest confidence level as the final recognition result. In other words, the sentence estimator 1202 takes word string W(s) in Formula (3) as the final recognition result.

$$W \cong \underset{w(s)}{\operatorname{argmax}} \prod_{t=1}^{T} \{P_{A_1}(o_t, s_t | s_{t-1}) + P_{A_2}(o_t, s_t | s_{t-1})\} P_L(s_t, s_{t-1}) \quad (3)$$

Here, the first speech means a response to a question from the voice recognition device 100 or a speech that the user makes when the user talks to the voice recognition device 100, instead of a response speech to a repetition request. The second speech means a response speech to a repetition request, which is a speech that the speaker makes intending the first speech.

In Formula (3), $P_{A1}$ represents the phoneme-string occurrence probability of the first speech, and $P_{A2}$ represents the phoneme-string occurrence probability of the second speech. At this time, as for the sum of the occurrence probabilities of each phoneme in the first speech and the second speech, values obtained by weighted addition according to the confidence level of the first speech and the confidence level of the second speech may be used. For example, assuming that $\alpha$ is the confidence level of the first speech, and $\beta$ is the confidence level of the second speech, the sum of the value obtained by multiplying the occurrence probability of each phoneme in the first speech by weight value $\alpha/(\alpha+\beta)$ and the value obtained by multiplying the occurrence probability of each phoneme in the second speech by weight value $\beta/(\alpha+\beta)$ may be used for the sum of the occurrence probabilities.

The sentence confidence level determiner 1210 determines whether the confidence level of the recognition result for the first speech estimated by the sentence estimator 1202 (the product of the phoneme-string occurrence probability and the word-string occurrence probability) is higher than or equal to threshold TH1. Then, if the confidence level is lower than threshold TH1, the sentence confidence level determiner 1210 stores the recognition result for the first speech into the recognition result storage 302 as the first recognition result and performs a repetition request. Here, the first recognition result includes necessary information to estimate the word string, for example, a recognized word string, the phoneme string corresponding to the word string, and the occurrence probabilities of the phonemes included in the phoneme string.

Figure 12:
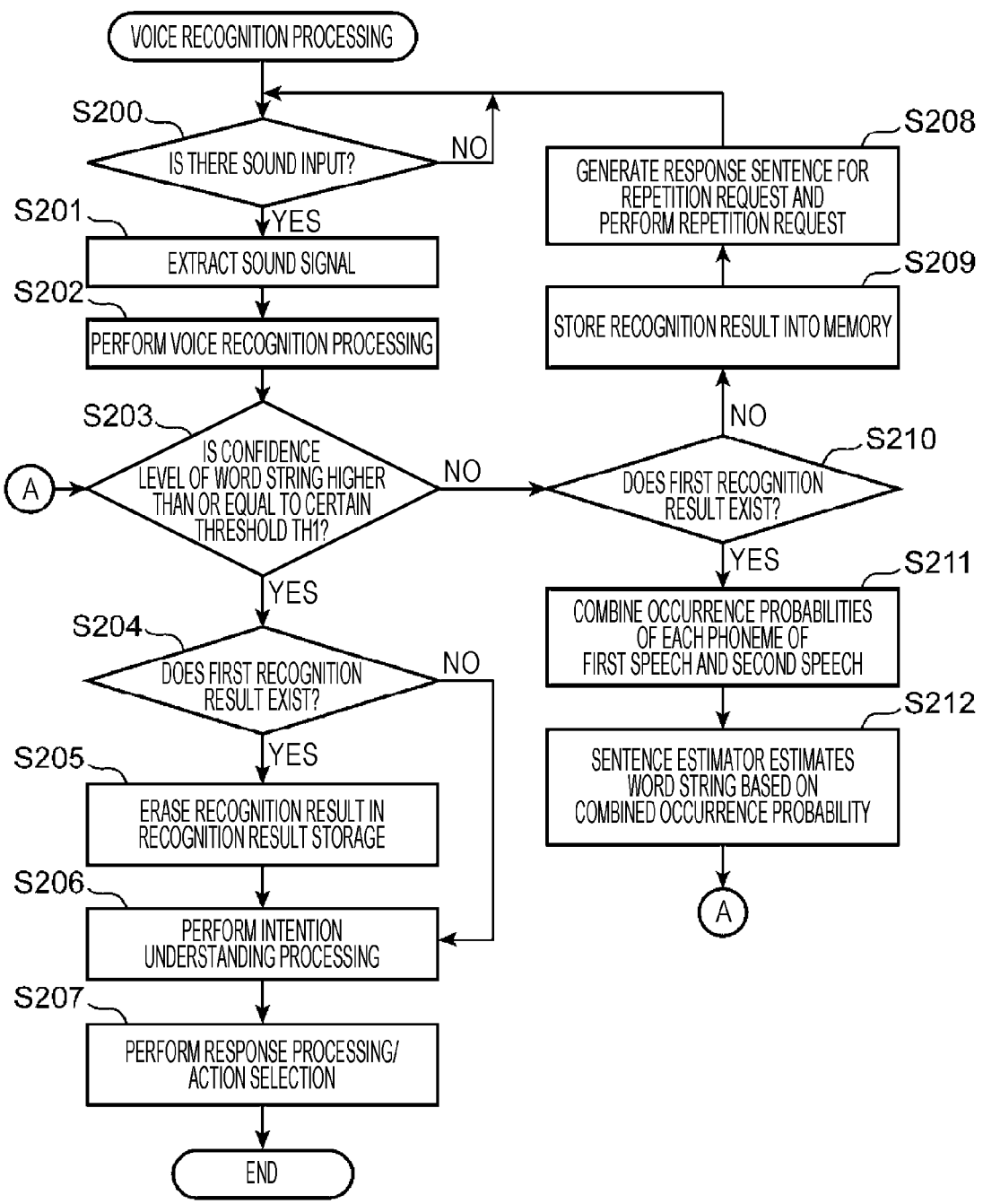
FIG. 12 is a flowchart illustrating an example of recognition processing in Embodiment 2.

FIG. 12 is a flowchart illustrating an example of the recognition processing in Embodiment 2. Processing at steps S200 and S201 is the same as that of steps S100 and S101 illustrated in FIG. 4.

The voice recognizer 200 performs voice recognition processing (step S202). Specifically, the phoneme estimator 201 estimates a phoneme of each sound section using an acoustic model in the same way as in Embodiment 1. The sentence estimator 1202 assigns word strings registered in the word dictionary 301 to the phoneme string estimated by the phoneme estimator 201. At this time, the sentence estimator 1202 assigns assignable word strings to each of all the phoneme strings estimated by the phoneme estimator 201 and obtains one or more word strings for each estimated phoneme string. Then, the sentence estimator 1202 outputs the word string that maximizes the product of the phoneme-string occurrence probability and the occurrence probability of the assigned word string as the recognition result, and the sentence estimator 1202 also outputs the largest value of the product to the sentence confidence level determiner 1210 as the confidence level of the word string obtained as the recognition result.

Next, the sentence confidence level determiner 1210 determines whether the confidence level of the word string recognized by the sentence estimator 1202 is higher than or equal to threshold TH1 (step S203). If the confidence level of the sentence is higher than or equal to threshold TH1 (YES at step S203), the process proceeds to step S204. Steps S204 to S207 are the same as steps S104 to S107 illustrated in FIG. 4.

On the other hand, if the confidence level of the word string recognized by the sentence estimator 1202 is lower than threshold TH1 (NO at step S203), the sentence confidence level determiner 1210 refers to the recognition result storage 302 to determine whether first recognition result is stored therein (step S210). If first recognition result is not stored (NO at step S210), the sentence confidence level determiner 1210 stores the word string recognized by the sentence estimator 1202, the phoneme string corresponding to the word string, and the occurrence probability of each phoneme obtained from $P_A(o_t,s_t|s_{t-1})$ in Formula (2) into the recognition result storage 302 as the recognition result for the first speech (first recognition result) (step S209). At step S208, in the same way as in step S108 in FIG. 4, the voice recognition device 100 performs a repetition request. With this repetition request, the speaker makes a second speech. Through the processing from step S200 to step S202, second recognition result for the second speech is obtained in the same way for the first speech. Then, if the confidence level of the second recognition result is lower than threshold TH1, determination result at step S203 is NO, and the process proceeds to step S210.

If the confidence level of the second recognition result is higher than or equal to threshold TH1 (YES at step S203), the second recognition result is determined as the one word string that the speaker intends, and the processing from step S205 to step S207 is executed.

Meanwhile, if first recognition result is stored in the recognition result storage 302 (YES at step S210), the phoneme occurrence probability combiner 1203 obtains the sum of the occurrence probability of each phoneme in the phoneme string included in the first recognition result stored in the recognition result storage 302 and the occurrence probability of each phoneme in the phoneme string of the second speech obtained at step S202 (step S211).

Next, the sentence estimator 1202 multiplies together the sums of the occurrence probabilities of each phoneme in the first speech and the second speech to calculate combined occurrence probability described later, and multiplies this combined occurrence probability by the word occurrence probability to calculate the confidence level of each word string. Then the sentence estimator 1202 recognizes the word string providing the largest confidence level as the one word string of the speech that the speaker made (step S212). When the processing at step S212 ends, the process moves to step S203.

Specific Example of Embodiment 2

Next, a specific example of Embodiment 2 will be described. In this specific example, for the sake of simplicity, a model capable of estimating only two word strings (sentences), "It's curry" and "It's cherry", is used to describe a voice recognition device 100 which recognizes a sentence.

It is assumed that the phoneme estimator 201 estimates the phoneme string for a speech to be "IH1 T S K AH1 R YI0" or "IH1 TS CH EH1 R YI0". In this case, the occurrence probability of each phoneme string is calculated as the product of the occurrence probabilities of the phonemes included in each phoneme string.

Figure 13:
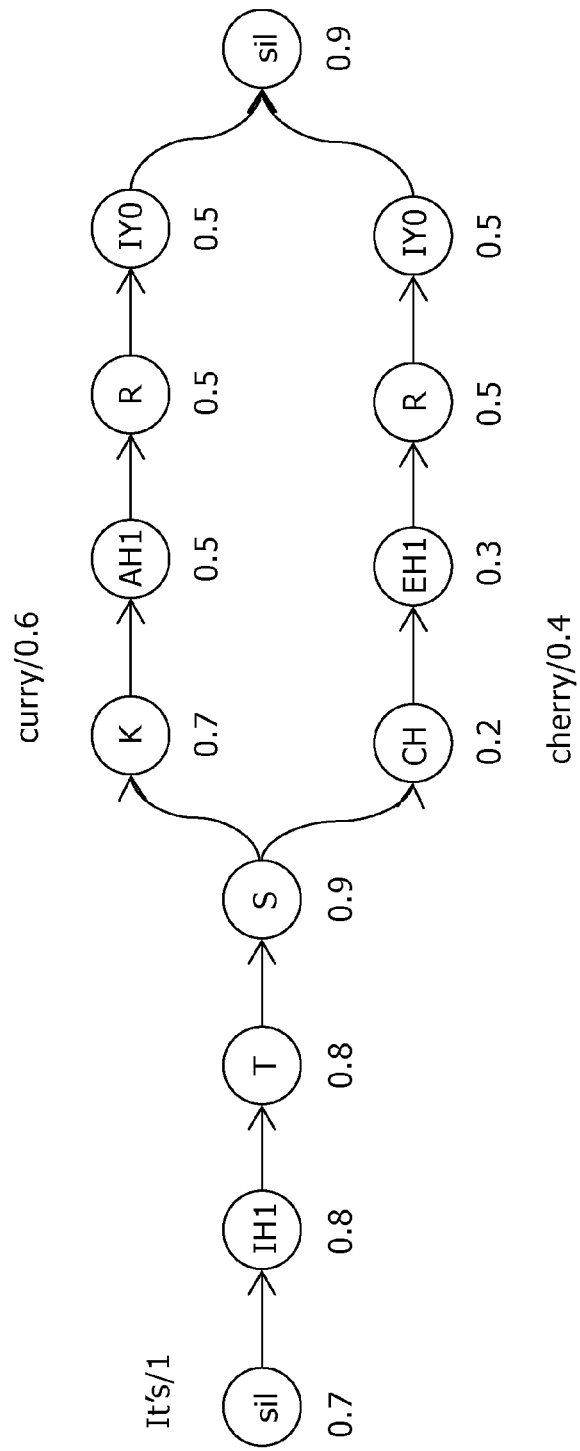
FIG. 13 is a diagram illustrating an example of a search space for the case where a 1-gram language model is used for a specific example of Embodiment 2.

FIG. 13 is a diagram illustrating an example of a search space for the case where a 1-gram language model is employed for the specific example of Embodiment 2.

In the search space in FIG. 13, the first phoneme "sil", which is an abbreviation of "silent", indicates a silent section. In addition, in FIG. 13, each set of alphabet letters indicates a phoneme, and the numerical value written under each set of alphabet letters is the occurrence probability of the phoneme. This search space includes elements "sil" at both the beginning and the end and the phoneme string "IH1 T S K AH1 R IY0" and the phoneme string "IH1 T S CH EH1 R IY0". Specifically, this search space begins with the element "sil", continues to "IH1 T S", then separates into two phoneme strings, "K AH1 R IY0" and "CH EH1 R IY0", and reaches the last element "sil".

In this case, the occurrence probability of the phoneme string "IH1 T S K AH1 R IY0" is calculated to be 0.7×0.8× 0.8× . . . ×0.5×0.9, and the occurrence probability of the phoneme string "IH1 T S CH EH1 R IY0" is calculated to be 0.7×0.8×0.8× . . . ×0.5×0.9.

Here, it is assumed that three words, "Curry", "Cherry", and "It's", and the occurrence probability of each word are registered in the word dictionary 301. In this case, the sentence estimator 1202 assigns these three words to the phoneme strings to obtain the search space illustrated in FIG. 13. The numerical value attached at the right side of each word indicates the occurrence probability of the word.

In general, n-gram is used for the word occurrence probability. In n-gram, it is assumed that the occurrence probability of a word depends on the immediately preceding word. In the example of FIG. 13, 1-gram is used. Since 1-gram does not depends on the immediately preceding word, the occurrence probability of a word itself is utilized. In this case, the probability that "It's" is said as the first word is 1. Then, the probability that it is followed by "Curry" is 0.6, and the probability that it is followed by "Cherry" is 0.4.

The sentence estimator 1202 extracts all the routes connecting the front element "sil" to the last element "sil" as phoneme strings and assigns assignable words to each phoneme string out of the words registered in the word dictionary 301 to obtain multiple word strings. In the example of FIG. 13, the word "It's" is assigned to the phoneme string "IH1 T S", the word "Curry" is assigned to the phoneme string "K AH1 R IY0", and the word "Cherry" is assigned to the phoneme string "CH EH1 R IY0". Accordingly, in the example of FIG. 13, the word strings "It's curry" and "It's cherry" are obtained.

Then, the multiplication value "0.7×0.8× . . . ×0.9" is obtained by multiplying together the occurrence probabilities of all the phonemes included in the phoneme string "IH1 T S K AH1 R IY0" and "sil" of the word string "It's curry", and the above multiplication value is multiplied by the occurrence probability "1" of the word "It's" and the occurrence probability "0.6" of the word "Curry" to obtain the confidence level of the word string "It's curry". In the same way as above, the confidence level of the word string "It's cherry" is obtained.

Then, out of the word strings "It's curry" and "It's cherry", the word string having the highest confidence level is estimated to be the recognition result. In the example of FIG. 13, since the confidence level of the word string "It's curry" is higher than the confidence level of the word string "It's cherry", the word string "It's curry" is selected to be the recognition result.

In the case of 2-gram, it is assumed that the word occurrence probability depends on only the immediately preceding word. Specifically, FIG. 14 illustrates a 2-gram dictionary consisting of only the three words, "It's", "Curry", and "Cherry". FIG. 14 is a diagram illustrating an example of a word dictionary 301 for the case of employing a 2-gram language model for the specific example of Embodiment 2. The 2-gram combinations that can be obtained from "sil" and the three words, "It's", "Curry", and "Cherry", are as follows. Specifically, possible 2-gram combinations are three sets for "sil": "It's", "Curry", and "Cherry"; three sets for "Curry": "It's", "Cherry", and "sil"; three sets for "Cherry": "It's", "Curry", and "sil"; and three sets for "It's": "Curry", "Cherry", and "sil". A total of 3×4=12 sets combinations are possible. Accordingly, these twelve combinations of 2-gram word strings are registered in the word dictionary 301 illustrated in FIG. 14.

Figure 15:
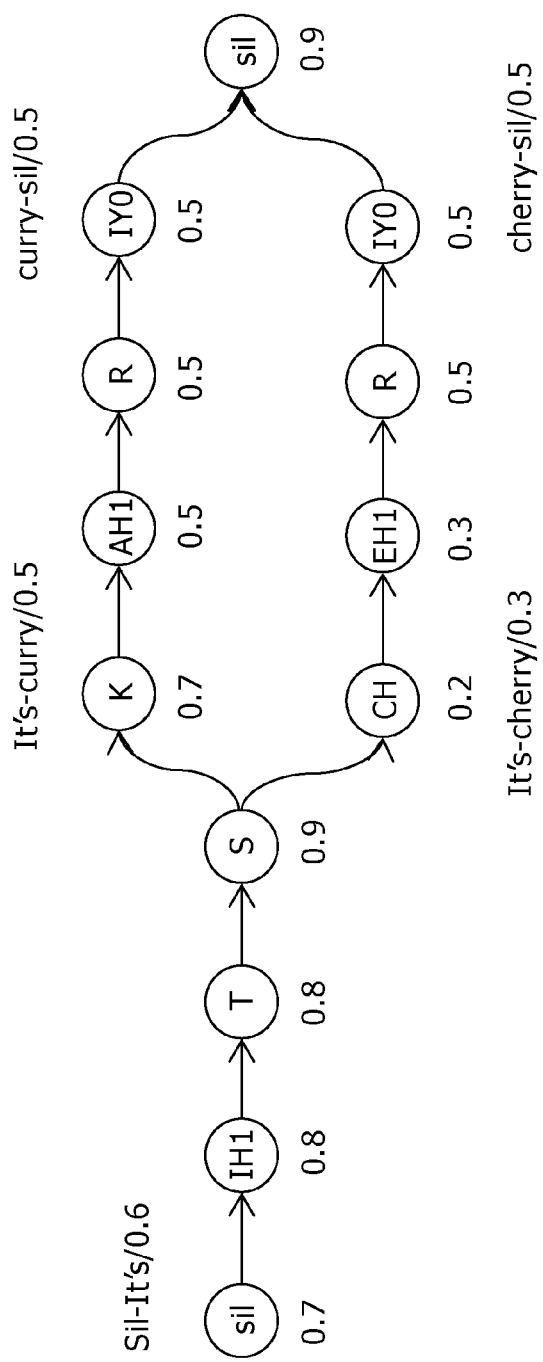
FIG. 15 is a diagram illustrating an example of a search space employing the 2-gram language model for the specific example of Embodiment 2.

The 2-gram search space using the word dictionary 301 illustrated in FIG. 14 is expressed as in FIG. 15. FIG. 15 is a diagram illustrating an example of a search space employing the 2-gram language model for the specific example of Embodiment 2. Note that in FIG. 15, the occurrence probabilities of the phoneme strings and each phoneme are the same as those in FIG. 13.

At this time, in the case where the word dictionary 301 as in FIG. 14 is stored, the probability that "It's" appears at the first word, in other words, the probability that "It's" appears next to the element "sil" is 0.6.

The probability that "Curry" appears next to "It's" is 0.5, and the probability that "Cherry" appears next to "It's" is 0.3. Further, the probability that "sil" appears next to "Curry" is 0.5, and the probability that "sil" appears next to "Cherry" is 0.5. In this case, the word string that maximizes the product of the occurrence probability of the phoneme string and the occurrence probabilities of the 2-gram word strings in each route illustrated in the graph of FIG. 15 is selected as the recognition result. Specifically, the product of the occurrence probabilities of the phonemes in the phoneme string "IH1 T S K AH1 R IY0" and the occurrence probabilities of "sil-It's", "It's curry", and "Curry-sil" (0.6, 0.5, and 0.5, respectively) is calculated to be the confidence level of the word string "It's curry". In the same way as above, the confidence level of the word string "It's cherry" is also calculated. In this example, because the confidence level of the word string "It's curry" is higher than that of "It's cherry", the word string "It's curry" is selected as the final recognition result. The same process also applies to cases where n-gram is 3-gram or more.

The sentence confidence level determiner 1210 determines whether the confidence level of the word string estimated by the sentence estimator 1202 is higher than or equal to threshold TH1. If both the confidence level of the first recognition result for the first speech and the confidence level of the second recognition result for the second speech are lower than threshold TH1, the phoneme occurrence probability combiner 1203 multiplies the sums together, each sum obtained by summing the occurrence probability of each phoneme in the first speech and the occurrence probability of each phoneme in the second speech, to calculate the combined occurrence probability.

The sentence estimator 1202 uses the combined occurrence probability calculated by the phoneme occurrence probability combiner 1203 to recognize the word string (sentence).

Figure 16:
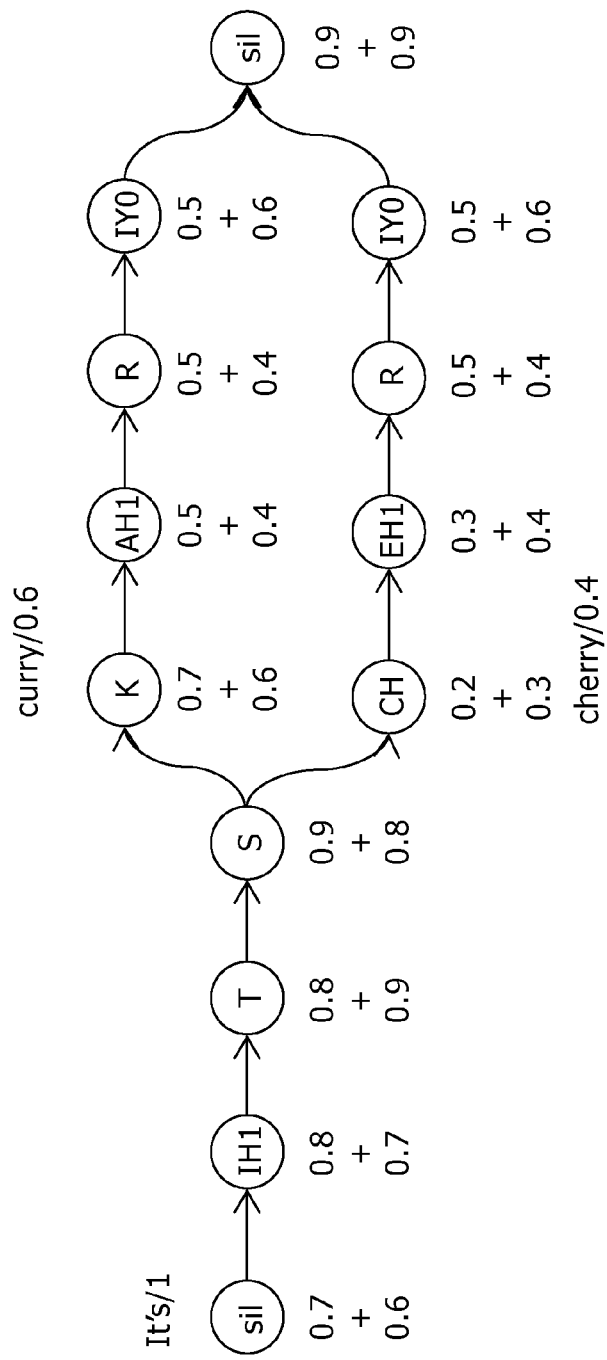
FIG. 16 is a diagram illustrating a search space for the case where the occurrence probabilities of each phoneme in the first recognition result and each phoneme in the second recognition result are combined in the specific example of Embodiment 2.

FIG. 16 is a diagram illustrating a search space for the case where the occurrence probabilities of each phoneme in the first recognition result and each phoneme in the second recognition result are combined in the specific example of Embodiment 2. FIG. 16 indicates a directed graph of the phoneme string "IH1 T S K AH1 R IY0" and the phoneme string "IH1 T S CH EH1 R IY0" as well as the occurrence probability of each phoneme in the first speech and those of the second speech in the same way as in FIG. 15. In the example of FIG. 16, 1-gram words are assigned. In FIG. 16, the numerical value written immediately under each phoneme indicates the occurrence probability for the first speech, and the numerical value immediately under the numerical value for the first speech indicates the occurrence probability for the second speech.

Here, the combined occurrence probability of the phoneme string "IH1 T S K AH1 R YI0" is $(0.7+0.6)\times(0.8+0.7)\times \ldots \times(0.5+0.6)\times(0.9+0.9)$. The combined occurrence probability of the phoneme string "IH1 T S CH EH1 R YI0" is $(0.7+0.6)\times(0.8+0.7)\times \ldots \times(0.5+0.6)\times(0.9+0.9)$.

In this case, the sentence estimator 1202 assigns the 1-gram word strings registered in the word dictionary 301 for each of the phoneme string "IH1 T S K AH1 R YI0" and the phoneme string "IH1 T S CH EH1 R YI0".

Then, the sentence estimator 1202 multiplies the combined occurrence probability calculated by the phoneme occurrence probability combiner 1203 by the word occurrence probabilities to calculate the confidence level of each word string. Then, the sentence estimator 1202 recognizes the phoneme string having the highest confidence level as the one word string that the speaker intends.

In FIG. 16, since the probability that "It's" appears at the first word is 1, and the probability that "Curry" appears next to "It's" is 0.6, the confidence level of the word string "It's curry" is calculated to be $(0.7+0.6)\times(0.8+0.7)\times \ldots \times(0.9+0.9)\times1\times0.6$. In the same way, since the probability that "It's" appears at the first word is 1, and the probability that "Cherry" appears next to "It's" is 0.4, the confidence level of the word string "It's cherry" is calculated to be $(0.7+0.6)\times(0.8+0.7)\times \ldots \times(0.9+0.9)\times1\times0.4$.

Here, because the confidence level of the word string "It's curry" is higher than that of the word string "It's cherry", it is recognized that the word string "It's curry" was said.

As described above, according to the voice recognition device 100 in Embodiment 2, even if recognition result having low reliability is obtained for a first speech, the recognition result is not discarded but utilized if recognition result having low reliability is obtained for a second speech. Thus, even when a repetition request does not lead to acquisition of reliable recognition result, both the recognition results are combined to recognize the one word string, which improves the accuracy in recognizing the one word string.

Note that the recognition result stored in the recognition result storage 302 at step S209 may include not only the immediately preceding recognition result but also multiple past recognition results obtained by repetition requests. In this case, the phoneme occurrence probability combiner 1203, at step S211, may combine the occurrence probabilities of each phoneme in multiple phoneme strings obtained as multiple past recognition results with the occurrence probability of each phoneme in the phoneme string obtained as the latest recognition result.

Embodiment 3

Figure 17:
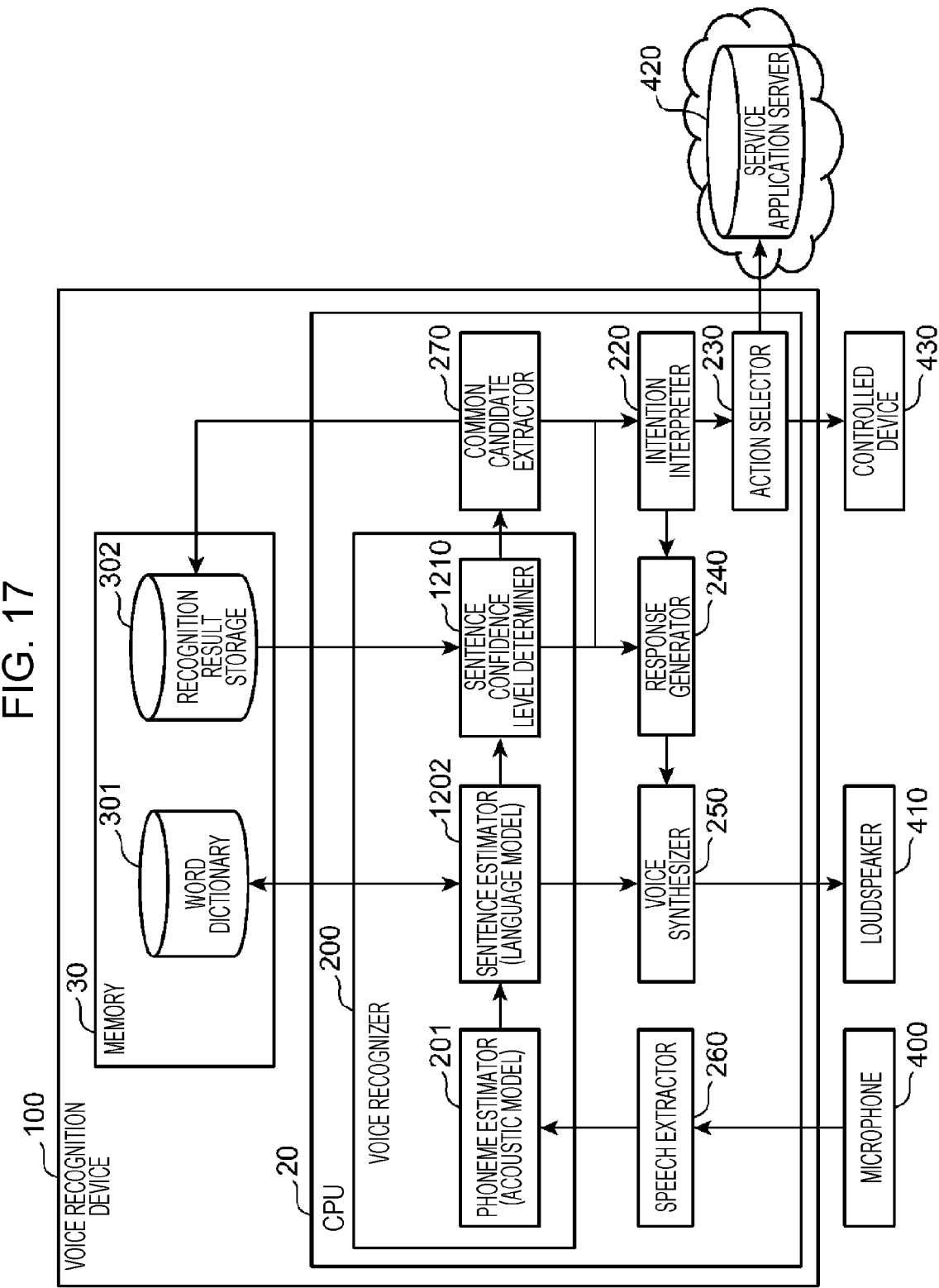
FIG. 17 is a diagram illustrating an example of the overall configuration of a voice dialogue system in Embodiment 3.

FIG. 17 is a diagram illustrating an example of the overall configuration of a voice dialogue system in Embodiment 3. FIG. 17 is different from FIG. 10 in that the phoneme occurrence probability combiner 1203 is eliminated, and a common candidate extractor 270 is added.

In Embodiment 3, the sentence estimator 1202 estimates the word string in the same way as in Embodiment 2 but does not select the word string having the highest confidence level as the recognition result. The sentence estimator 1202 extracts top n word strings in descending order of the confidence level as recognition candidates and regards the top n recognition candidates (n-best) as the recognition result. N-best means top n recognition candidates in descending order of the confidence level out of the multiple recognition candidates included in the recognition result.

In the case where the sentence confidence level determiner 1210 determines that the largest value of the confidence level in the first recognition result is lower than threshold TH1, and the largest value of the confidence level in the second recognition result is also lower than threshold TH1, the common candidate extractor 270 compares recognition candidates (n-best) for the first speech with recognition candidates (n-best) for the second speech, extracts common recognition candidates, and determines a final recognition word string based on the extraction result.

Figure 18:
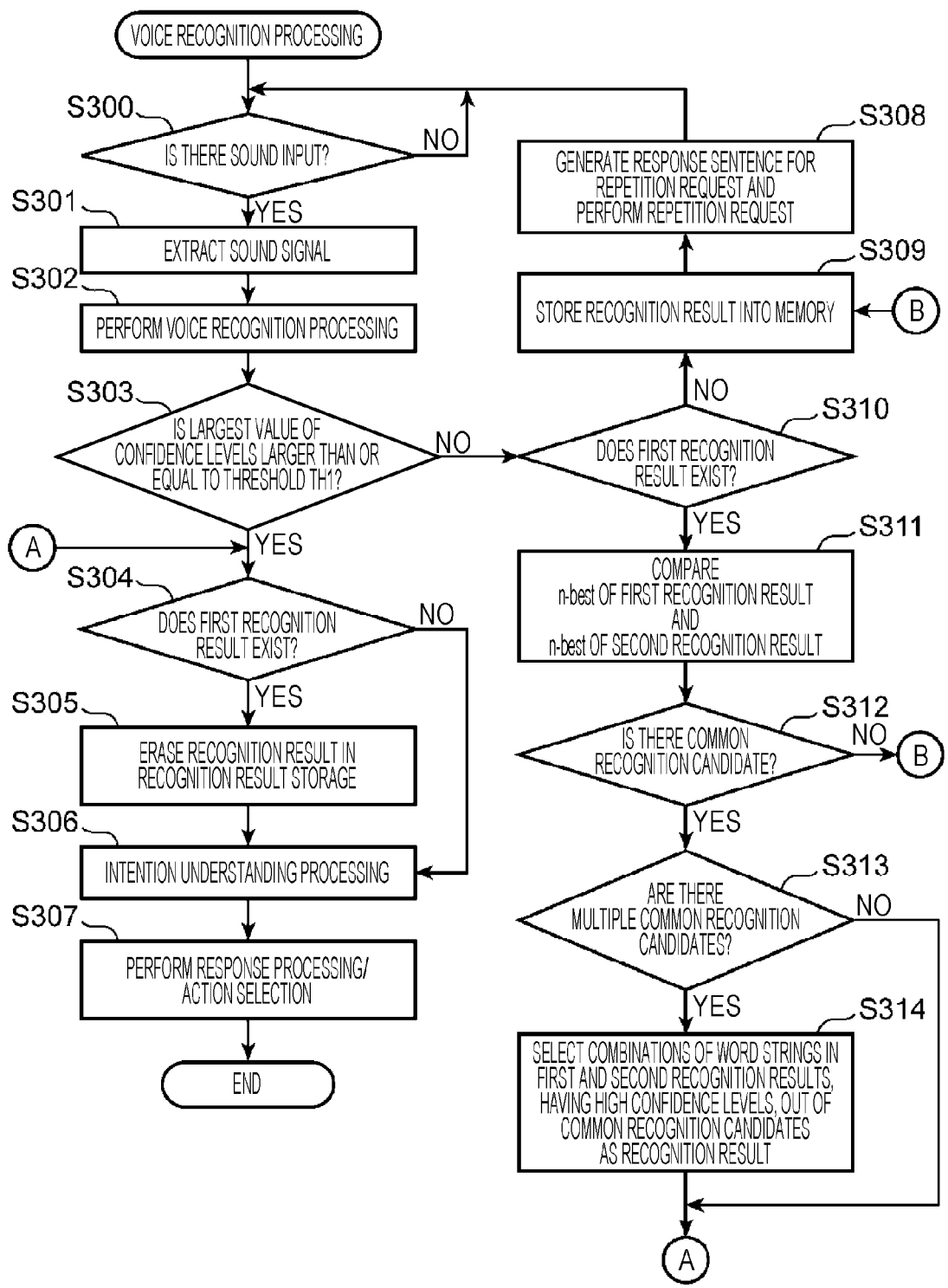
FIG. 18 is a flowchart for explaining an example of recognition processing in Embodiment 3.

FIG. 18 is a flowchart for explaining an example of recognition processing in Embodiment 3. Processing from step S300 to step S307 is basically the same as the processing from step S200 to step S207 illustrated in FIG. 12. However, at step S303, the sentence confidence level determiner 1210 determines whether the largest value of the confidence level for the first recognition result estimated by the sentence estimator 1202 is larger than or equal to threshold TH1.

If the largest value of the confidence level for the first recognition result is larger than or equal to threshold TH1 at step S303 (YES step S303), the recognition candidate having the largest value is determined as the one word string that the speaker intended, and the processing from step S305 to step S307 is executed.

On the other hand, if the largest value of the confidence level for the first recognition result is smaller than threshold TH1 at step S303 (NO at step S303), the sentence confidence level determiner 1210 refers to the recognition result storage 302 to determine whether first recognition result is stored therein (step S310). If first recognition result is not stored (NO at step S310), as illustrated in FIG. 19, the sentence confidence level determiner 1210 acquires, as n-best, n recognition candidates out of the recognition candidates included in the recognition result for the first speech in descending order of the confidence level (the product of the occurrence probabilities of the phonemes and the products of the occurrence probabilities of the words) from the sentence estimator 1202, and stores the acquired candidates into the recognition result storage 302. At step S308, the voice recognition device 100 performs a repetition request in the same way as in step S208 illustrated in FIG. 10. With this repetition request, the speaker makes a second speech. Through the processing from step S300 to step S302, second recognition result for the second speech is obtained in the same way for the first speech. Then, if the largest value of the confidence level in the second recognition result is lower than threshold TH1, determination result at step S303 is NO, and the process proceeds to step S310.

On the other hand, if the largest value of the confidence level in the second recognition result is larger than or equal to threshold TH1 (YES at step S303), the recognition candidate having the largest value is determined as the one word string that the speaker intends, and the processing from step S305 to step S307 is executed.

Meanwhile, if first recognition result is stored in the recognition result storage 302 (YES at step S310), the common candidate extractor 270 compares the n-best candidates for the first recognition result and the n-best candidates for the second recognition result (step S311).

Next, the common candidate extractor 270 determines from the comparison result whether there is a common recognition candidate (step S312). If there is a common recognition candidate (YES at step S312), the common candidate extractor 270 determines whether there are multiple common candidates (step S313). If there are multiple common recognition candidates (YES at step S313), the common candidate extractor 270 calculates the sum of the confidence level of the first recognition result and the confidence level of the second recognition result for each of the multiple common recognition candidates. Then, the common candidate extractor 270 may determine the recognition candidate having the largest sum of the confidence level as the final recognition result or may determines multiple recognition candidates selected in descending order of the sum of the confidence levels as the final recognition result. When the processing at step S314 ends, the process moves to step S304. In addition, the common candidate extractor 270 may perform checking speeches described at step S116 in FIG. 4 for the multiple recognition candidates obtained in descending order of the sum of the confidence levels and determine the recognition candidate that the speaker agreed to as the final recognition result.

FIG. 19 is a diagram illustrating an example of 5-best candidates for the first recognition result in Embodiment 3. FIG. 20 is a diagram illustrating an example of 5-best candidates for the second recognition result in Embodiment 3. The common recognition candidates between FIGS. 19 and 20 are "I like curry" and "I want curry". At this time, for the sum of the confidence levels of the first recognition result and the second recognition result, "I like curry" is 1.15 (=0.60+0.55), and "I want curry" is 0.78 (=0.51+0.27). In this case, "I like curry" having the largest sum of the confidence level is determined as the final recognition result. Alternatively, both of the recognition candidates may be determined as the final confidence levels.

Meanwhile, if there is no recognition candidate (NO at step S312), the process moves to step S309. The common candidate extractor 270 also stores the second recognition result into the recognition result storage 302 in addition to the first recognition result at step S309, and outputs to the response generator 240 an instruction to generate a response sentence for a repetition request to perform a further repetition request to the speaker (step S308). With this process, a third recognition result is obtained. Then, if the largest value of the confidence levels of the third recognition result is lower than threshold TH1, the first, second, and third recognition results are compared, and common recognition candidates are extracted. In this case, if there is a recognition candidate that is common at least two of the first, second, and third recognition results, the recognition candidate is extracted as a common recognition result.

As described above, according to the voice recognition device 100 according to Embodiment 3, even if recognition result having low reliability is obtained for a first speech, the recognition result is not discarded but utilized if recognition result having low reliability is obtained for a second speech. Thus, even when a repetition request does not lead to acquisition of reliable recognition result, word strings recognized in both the first speech and the second speech are used to recognize the one word string, which improves the accuracy in recognizing the one word string.

(Robot)

Figure 21:
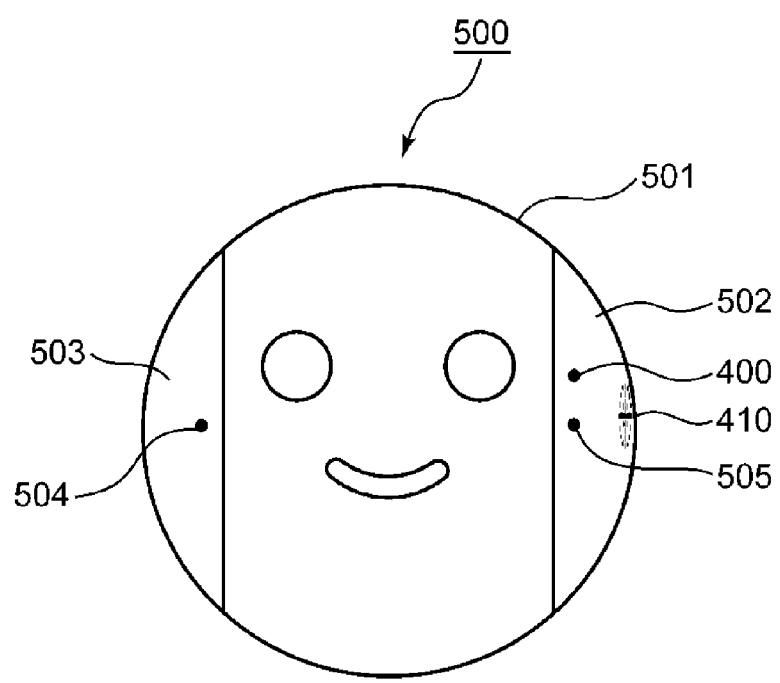
FIG. 21 is an external view of a robot in which a voice recognition device according to one of Embodiments 1 to 3 is implemented.

The voice recognition device 100 may be implemented in a robot 500 as illustrated in FIG. 21. FIG. 21 is an external view of the robot 500 in which the voice recognition device 100 according to one of Embodiments 1 to 3 is implemented. The robot 500 includes a main housing 501 in a spherical belt shape, first spherical crown portion 502, and second spherical crown portion 503. The main housing 501, first spherical crown portion 502, and second spherical crown portion 503 constitute a sphere as a whole. In other words, the robot 500 has a spherical shape. In addition, the robot 500 has a camera 504 on the second spherical crown portion 503 and a distance sensor 505, loudspeaker 410, and microphone 400 on the first spherical crown portion 502.

The camera 504 acquires images of the surrounding environment of the robot 500. The distance sensor 505 acquires information of the distance from the robot 500 to the surrounding environment. Note that although in this embodiment, the robot 500 includes the camera 504 on the second spherical crown portion 503 and the distance sensor 505, loudspeaker 410, and microphone 400 on the first spherical crown portion 502, the arrangement is not limited to this. A camera 504, distance sensor 505, loudspeaker 410, and microphone 400 only need to be included in at least one of the first spherical crown portion 502 and the second spherical crown portion 503.

The center of the first spherical crown portion 502 and the center of the second spherical crown portion 503 are fixedly connected to each other with a shaft (not illustrated) provided inside the main housing 501. The main housing 501 is rotatably attached to the shaft. In addition, a frame (not illustrated) and a display (not illustrated) are also attached to the shaft. Attached to the frame is a first motor (not illustrated) to rotate the main housing 501. Rotation of this first motor (not illustrated) rotates the main housing 501 relative to the first spherical crown portion 502 and the second spherical crown portion 503, which moves the robot 500 forward or backward. The first motor and the main housing 501 is an example of a moving mechanism. Note that since when the robot 500 moves forward or backward, the first spherical crown portion 502 and the second spherical crown portion 503 is in the stop state, the camera 504, distance sensor 505, microphone 400, and loudspeaker 410 are kept facing ahead of the robot 1. The display shows an image depicting the eyes and mouth of the robot 1. This display is attached such that the angle of the display relative to the shaft can be adjusted by the power of the second motor (not illustrated). Thus, the direction of the eyes and mouth of the robot is adjusted by adjusting the angle of the display to the shaft. Note that since the display is attached to the shaft separately from the main housing 501, the angle of the display to the shaft does not change even when the main housing 501 rotates. Thus, the robot 500 can move forward or backward with the direction of the eyes and mouth kept fixed.

INDUSTRIAL APPLICABILITY

Since this disclosure improves the accuracy in voice recognition, it is useful, for example, for the technical field of robots that performs dialogue with a little child whose speech is not clear.

What is claimed is:

1. A voice recognition method, comprising:
receiving, via a microphone, a first speech that a speaker makes intending one word, the first speech including N phonemes, where N is a natural number of 2 or more;
calculating occurrence probabilities of all kinds of phonemes for each of the N phonemes included in the first speech;
recognizing a phoneme string, in which phonemes each having the highest probability are lined in order, to be a first phoneme string corresponding to the first speech, the phonemes corresponding to the respective N phonemes from a first phoneme to an N-th phoneme included in the first speech;

calculating a first value by multiplying together occurrence probabilities that the N phonemes included in the first phoneme string have;

when the first value is smaller than a first threshold, outputting a voice to prompt the speaker to repeat the one word, via a loudspeaker;

receiving, via the microphone, a second speech that the speaker repeats intending the one word, the second speech including M phonemes, where M is a natural number of 2 or more;

calculating occurrence probabilities of all kinds of phonemes for each of the M phonemes included in the second speech;

recognizing a phoneme string, in which phonemes each having the highest probability are lined in order, to be a second phoneme string corresponding to the second speech, the phonemes corresponding to the respective M phonemes from a first phoneme to an M-th phoneme included in the second speech;

calculating a second value by multiplying together occurrence probabilities that the M phonemes included in the second phoneme string have;

when the second value is smaller than the first threshold, extracting a phoneme having occurrence probability higher than a second threshold out of the first phoneme string and a phoneme having occurrence probability higher than the second threshold out of the second phoneme string;

extracting a word including the extracted phonemes from a dictionary stored in a memory, the dictionary associating words with respective phoneme strings; and when the number of extracted words is one, recognizing the extracted word to be the one word.

2. The voice recognition method according to claim 1, further comprising:

when the number of the extracted words is plural, outputting a voice to ask the speaker whether the speaker said each of the extracted words, via the loudspeaker;

receiving an affirmative answer or a negative answer from the speaker via the microphone; and recognizing a word corresponding to the affirmative answer to be the one word.

3. A non-transitory computer-readable recording medium, storing a program that causes a computer to execute the voice recognition method according to claim 1.

4. A voice recognition method, comprising:

receiving, via a microphone a, first speech that a speaker makes intending one word string, the first speech including N phonemes, where N is a natural number of 2 or more;

calculating a confidence level X1 of a word string estimated for the first speech $$X1 = \max \prod_{t=1}^{T} P_{A1}(o_t, s_t | s_{t-1}) P_{L1}(s_t, s_{t-1})$$

where t is a number specifying one of frames constituting the first speech,

T is the total number of the frames constituting the first speech, $P_{A1}(o_t, s_t | s_{t-1})$ is a probability that a certain phoneme appears at a t-th frame, which is next to a phoneme string corresponding to a state $s_{t-1}$ of from a first frame to a (t−1)-th frame of the first speech, and the phoneme string corresponding to the state $s_{t-1}$ transitions to a phoneme string corresponding to a state $s_t$, $o_t$ is a physical quantity that is for estimating the certain phoneme and is obtained from the first speech, the certain phoneme is one of all kinds of phonemes, and $P_{L1}(s_t, s_{t-1})$ is a probability that a certain word appears at a t-th frame next to a word string corresponding to a state $s_{t-1}$, and the word string corresponding to the state $s_{t-1}$ transitions to a word string corresponding to a state $s_t$ in the first speech;

determining whether the confidence level X1 is higher than or equal to a threshold;

when the confidence level X1 is lower than the threshold, outputting a voice to prompt the speaker to repeat the one word string, via a loudspeaker;

receiving, via the microphone, a second speech that the speaker repeats intending the one word string;

when the confidence level X1 of the second speech is lower than the threshold, calculating a combined confidence level X for each of all word strings estimated from the first speech and the second speech $$X = \prod_{t=1}^{T} \{P_{A_1}(o_t, s_t | s_{t-1}) + P_{A_2}(q_t, s_t | s_{t-1})\} P_L(s_t, s_{t-1})$$

where t is a number specifying one of frames constituting the first speech and the second speech, T is the total number of the frames constituting the first speech and the second speech, $P_{A1}(o_t, s_t | s_{t-1})$ is a probability that a certain phoneme appears at a t-th frame, which is next to a phoneme string corresponding to a state $s_{t-1}$ of from a first frame to a (t−1)-th frame of the first speech, and the phoneme string corresponding to the state $s_{t-1}$ transitions to a phoneme string corresponding to a state $s_t$, $o_t$ is a physical quantity that is for estimating the certain phoneme and is obtained from the first speech, the certain phoneme is one of all kinds of phonemes, $P_{A2}(q_t, s_t | s_{t-1})$ is a probability that a certain phoneme appears at a t-th frame, which is next to a phoneme string corresponding to a state $s_{t-1}$ of from a first frame to a (t−1)-th frame of the second speech, and the phoneme string corresponding to the state $s_{t-1}$ transitions to a phoneme string corresponding to a state $s_t$, $q_t$ is a physical quantity that is for estimating the certain phoneme and is obtained from the second speech, and $P_L(s_t, s_{t-1})$ is a probability that a certain word appears at a t-th frame next to a word string corresponding to the state $s_{t-1}$ and the word string corresponding to the state $s_{t-1}$ transitions to a word string corresponding to the state $s_t$ in the first speech; and recognizing a word string corresponding to the state $s_t$ that gives the largest value of the combined confidence levels X, as the one word string.

5. A voice recognition method, comprising:

receiving, via a microphone, a first speech that a speaker makes intending one word string, the first speech including N phonemes, where N is a natural number of 2 or more;

calculating a confidence level X1 of a word string estimated for the first speech $$X1 = \prod_{t1=1}^{T1} P_{A1}(o_{t1}, s_{t1} | s_{t1-1}) P_{L1}(s_{t1}, s_{t1-1})$$

where t1 is a number specifying one of frames constituting the first speech,

T1 is the total number of the frames constituting the first speech, $P_{A1}(o_{t1}, s_{t1} | s_{t-1})$ is a probability that a certain phoneme appears at a t1-th frame, which is next to a phoneme string corresponding to a state $s_{t1-1}$ of from a first frame to a (t1−1)-th frame of the first speech, and the phoneme string corresponding to the state $s_{t1-1}$ transitions to a phoneme string corresponding to a state $s_{t1}$, $o_{t1}$ is a physical quantity that is for estimating the certain phoneme and is obtained from the first speech, the certain phoneme is one of all kinds of phonemes, and $P_{L1}(s_{t1}, s_{t1-1})$ is a probability that a certain word appears at the t1-th frame next to a word string corresponding to a state $s_{t1-1}$, and the word string corresponding to the state $s_{t1-1}$ transitions to a word string corresponding to a state $s_{t1}$ in the first speech;

determining whether the largest value MaxX1 of the confidence levels X1 is higher than or equal to a threshold;

when the largest value MaxX1 is smaller than the threshold, extracting first word strings that are estimated for the first speech and give top M values of the confidence levels X1, where M is a natural number of 2 or more;

outputting a voice to prompt the speaker to repeat the one word string, via a loudspeaker;

receiving via the microphone a second speech that the speaker repeats intending the one word string;

calculating a confidence level X2 for each one of all word strings estimated for the second speech $$X2 = \prod_{t2=1}^{T2} P_{A2}(o_{t2}, s_{t2} | s_{t2-1}) P_{L2}(s_{t2}, s_{t2-1})$$

where t2 is a number specifying one of frames constituting the second speech,

T2 is the total number of the frames constituting the second speech, $P_{A2}(o_{t1}, s_{t2} | s_{t2-1})$ is a probability that a certain phoneme appears at a t2-th frame, which is next to a phoneme string corresponding to a state $s_{t2-1}$ of from a first frame to a (t2−1)-th frame of the second speech, and the phoneme string corresponding to the state $s_{t2-1}$ transitions to a phoneme string corresponding to a state $s_{t2}$, $o_{t2}$ is a physical quantity that is for estimating the certain phoneme and is obtained from the second speech, and $P_{L2}(s_{t2}, s_{t2-1})$ is a probability that a certain word appears at a t2-th frame next to a word string corresponding to a state $s_{t2-1}$, and the word string corresponding to the state $s_{t2-1}$ transitions to a word string corresponding to a state $s_{t2}$ in the second speech;

determining whether the largest value MaxX2 of the confidence levels X2 is larger than or equal to a threshold:

when the largest value MaxX2 is lower than the threshold, extracting second word strings that are estimated for the second speech and give top M values of the confidence levels X2; and when there is a common word string between the first word strings and the second word strings, recognizing the common word string as the one word string.

6. A voice recognition device, comprising:
a processor,
a memory,
a microphone, and
a loudspeaker,
wherein the processor
receives, via the microphone, a first speech that a speaker makes intending one word, the first speech including N phonemes, where N is a natural number of 2 or more;

calculates occurrence probabilities of all kinds of phonemes for each of the N phonemes included in the first speech;

recognizes a phoneme string, in which phonemes each having the highest probability are lined in order, to be a first phoneme string corresponding to the first speech, the phonemes corresponding to the respective N phonemes from a first phoneme to an N-th phoneme included in the first speech;

calculates a first value by multiplying together occurrence probabilities that the N phonemes included in the first phoneme string have;

when the first value is smaller than a first threshold, outputs a voice to prompt the speaker to repeat the one word, via the loudspeaker;

receives, via the microphone, a second speech that the speaker repeats intending the one word, the second speech including M phonemes, where M is a natural number of 2 or more;

calculates occurrence probabilities of all kinds of phonemes for each of the M phonemes included in the second speech;

recognizes a phoneme string in which phonemes each having the highest probability are lined in order, to be a second phoneme string corresponding to the second speech, the phonemes corresponding to the respective M phonemes from a first phoneme to an M-th phoneme included in the second speech;

calculates a second value by multiplying together occurrence probabilities that the M phonemes included in the second phoneme string have;

when the second value is smaller than the first threshold, extracts a phoneme having occurrence probability higher than a second threshold out of the first phoneme string and a phoneme having occurrence probability higher than the second threshold out of the second phoneme string;

extracts a word including the extracted phonemes from a dictionary stored in the memory, the dictionary associating words with respective phoneme strings; and when the number of extracted words is one, recognizes the extracted word to be the one word.

7. A robot, comprising:
the voice recognition device according to claim 6;
a housing that houses the voice recognition device; and
a moving mechanism that moves the housing.

8. A voice recognition device, comprising:
a processor,
a microphone, and
a loudspeaker,
wherein the processor
receives via the microphone a first speech that a speaker makes intending one word string, the first speech including N phonemes, where N is a natural number of 2 or more;
calculates a confidence level X1 of a word string estimated for the first speech $$X1 = \max \prod_{t=1}^{T} P_{A1}(o_t, s_t | s_{t-1}) P_{L1}(s_t, s_{t-1})$$

where t is a number specifying one of frames constituting the first speech,
T is the total number of the frames constituting the first speech,
$P_{A1}(o_t, s_t|s_{t-1})$ is a probability that a certain phoneme appears at a t-th frame, which is next to a phoneme string corresponding to a state $s_{t-1}$ of from a first frame to a (t−1)-th frame of the first speech, and the phoneme string corresponding to the state $s_{t-1}$ transitions to a phoneme string corresponding to a state $s_t$,
$o_t$ is a physical quantity that is for estimating the certain phoneme and is obtained from the first speech,
the certain phoneme is one of all kinds of phonemes, and
$P_{L1}(s_t, s_{t-1})$ is a probability that a certain word appears at a t-th frame next to a word string corresponding to a state $s_{t-1}$, and the word string corresponding to the state $s_{t-1}$ transitions to a word string corresponding to a state $s_t$ in the first speech;
determines whether the confidence level X1 is higher than or equal to a threshold;
when the confidence level X1 is lower than the threshold, outputs a voice to prompt the speaker to repeat the one word string, via the loudspeaker;
receives, via the microphone, a second speech that the speaker repeats intending the one word string;
when the confidence level X1 of the second speech is lower than the threshold, calculates a combined confidence level X for each of all word strings estimated from the first speech and the second speech $$X = \prod_{t=1}^{T} \{P_{A_1}(o_t, s_t | s_{t-1}) + P_{A_2}(q_t, s_t | s_{t-1})\} P_L(s_t, s_{t-1})$$

where t is a number specifying one of frames constituting the first speech and the second speech,
T is the total number of the frames constituting the first speech and the second speech,
$P_{A1}(o_t, s_t|s_{t-1})$ is a probability that a certain phoneme appears at a t-th frame, which is next to a phoneme string corresponding to a state $s_{t-1}$ of from a first frame to a (t−1)-th frame of the first speech, and the phoneme string corresponding to the state $s_{t-1}$ transitions to a phoneme string corresponding to a state $s_t$,
$o_t$ is a physical quantity that is for estimating the certain phoneme and is obtained from the first speech,
the certain phoneme is one of all kinds of phonemes,
$P_{A2}(q_t, s_t|s_{t-1})$ is a probability that a certain phoneme appears at a t-th frame, which is next to a phoneme string corresponding to a state $s_{t-1}$ of from a first frame to a (t−1)-th frame of the second speech, and the phoneme string corresponding to the state $s_{t-1}$ transitions to a phoneme string corresponding to a state $s_t$,
$q_t$ is a physical quantity that is for estimating the certain phoneme and is obtained from the second speech, and
$P_L(s_t, s_{t-1})$ is a probability that a certain word appears at a t-th frame next to a word string corresponding to the state $s_{t-1}$, and the word string corresponding to the state $s_{t-1}$ transitions to a word string corresponding to the state $s_t$ in the first speech; and
recognizes a word string corresponding to the state $s_t$ that gives the largest value of the combined confidence levels X, as the one word string.

9. A robot, comprising:
the voice recognition device according to claim 8;
a housing that houses the voice recognition device; and
a moving mechanism that moves the housing.

10. A voice recognition device, comprising:
a processor,
a microphone, and
a loudspeaker,
wherein the processor
receives, via the microphone, a first speech that a speaker makes intending one word string, the first speech including N phonemes, where N is a natural number of 2 or more;
calculates a confidence level X1 of a word string estimated for the first speech $$X1 = \prod_{t1=1}^{T1} P_{A1}(o_{t1}, s_{t1} | s_{t1-1}) P_{L1}(s_{t1}, s_{t1-1})$$

where t1 is a number specifying one of frames constituting the first speech,
T1 is the total number of the frames constituting the first speech,
$P_{A1}(o_{t1}, s_{t1}|s_{t1-1})$ is a probability that a certain phoneme appears at a t1-th frame which is next to a phoneme string corresponding to a state $s_{t1-1}$ of from a first frame to a (t1−1)-th frame of the first speech, and the phoneme string corresponding to the state $s_{t1-1}$ transitions to a phoneme string corresponding to a state $s_{t1}$,
$o_{t1}$ is a physical quantity that is for estimating the certain phoneme and is obtained from the first speech,
the certain phoneme is one of all kinds of phonemes, and
$P_{L1}(s_{t1}, s_{t1-1})$ is a probability that a certain word appears at the t1-th frame next to a word string corresponding to a state $s_{t1-1}$, and the word string corresponding to the state $s_{t1-1}$ transitions to a word string corresponding to a state $s_{t1}$ in the first speech;

determines whether the largest value MaxX1 of the confidence levels X1 is higher than or equal to a threshold;

when the largest value MaxX1 is smaller than the threshold, extracts first word strings that are estimated for the first speech and give top M values of the confidence levels X1, where M is a natural number of 2 or more;

outputs a voice to prompt the speaker to repeat the one word string, via the loudspeaker;

receives via the microphone a second speech that the speaker repeats intending the one word string;

calculates a confidence level X2 for each one of all word strings estimated for the second speech $$X2 = \prod_{t2=1}^{T2} P_{A2}(o_{t2}, s_{t2} | s_{t2-1}) P_{L2}(s_{t2}, s_{t2-1})$$

where t2 is a number specifying one of frames constituting the second speech,

T2 is the total number of the frames constituting the second speech, $P_{A2}(o_{t2}, s_{t2}|s_{t2-1})$ is a probability that a certain phoneme appears at a t2-th frame, which is next to a phoneme string corresponding to a state $s_{t2-1}$ of from a first frame to a (t2−1)-th frame of the second speech, and the phoneme string corresponding to the state $s_{t2-1}$ transitions to a phoneme string corresponding to a state $s_{t2}$, $o_{t2}$ is a physical quantity that is for estimating the certain phoneme and is obtained from the second speech, and $P_{L2}(s_{t2}, s_{t2-1})$ is a probability that a certain word appears at a t2-th frame next to a word string corresponding to a state $s_{t2-1}$, and the word string corresponding to the state $s_{t2-1}$ transitions to a word string corresponding to a state $s_{t2}$ in the second speech;

determines whether the largest value MaxX2 of the confidence levels X2 is larger than or equal to a threshold;

when the largest value MaxX2 is lower than the threshold, extracts second word strings that are estimated for the second speech and give top M values of the confidence levels X2; and when there is a common word string between the first word strings and the second word strings, recognizes the common word string as the one word string.

11. A robot, comprising:

the voice recognition device according to claim 10;

a housing that houses the voice recognition device; and a moving mechanism that moves the housing.

\* \* \* \* \*